United States Patent [19]

Strub

[11] 4,118,778

[45] Oct. 3, 1978

[54] METHOD OF AND AN APPARATUS FOR CONTROLLING THE QUANTITY OF FILTER AID FED TO A SEDIMENTATION FILTER IN A GIVEN UNIT OF TIME DURING FILTRATION

[75] Inventor: Fritz Strub, St. Gallen, Switzerland

[73] Assignee: Filtrox Maschinenbau A.G., St. Gallen, Switzerland

[21] Appl. No.: 815,285

[22] Filed: Jul. 13, 1977

[30] Foreign Application Priority Data

Jul. 16, 1976 [CH] Switzerland .......................... 9134/76

[51] Int. Cl.$^2$ ..................... G06G 7/58; B01D 37/02
[52] U.S. Cl. ..................................... 364/502; 210/193; 364/109
[58] Field of Search ............... 364/109, 496, 497, 500, 364/502; 210/143, 103, 104, 105, 101, 86, 87, 90, 97, 75, 193, 198 R, 42 R, 53, 96 R; 23/230 A, 253 A

[56] References Cited

U.S. PATENT DOCUMENTS

| | | | |
|---|---|---|---|
| 3,348,685 | 10/1967 | Miller | 210/193 X |
| 3,399,133 | 8/1968 | Gerdes et al. | 210/42 R |
| 3,551,330 | 12/1970 | Jernqvist et al. | 210/86 X |
| 3,605,775 | 9/1971 | Zaander et al. | 210/96 X |
| 3,693,797 | 9/1972 | Topol | 210/193 X |
| 3,725,263 | 4/1973 | Harris et al. | 210/96 X |

*Primary Examiner*—Joseph F. Ruggiero
*Attorney, Agent, or Firm*—William J. Daniel

[57] ABSTRACT

A method of and an apparatus for controlling the quantity of filter aid fed to a settling filter in a given unit of time during filtration. The pressure drop across the filter is determined and used to provide a first control magnitude, the quantity of liquid flowing through the filter per unit of time is determined and used to give a second magnitude, and the ratio of the first to the second magnitudes is determined as a third control magnitude, the quantity of filter aid delivered to the liquid feed to the filter is adjusted in proportion to such third control magnitude. Various ways of relating each control magnitude to its control variable are disclosed.

49 Claims, 13 Drawing Figures

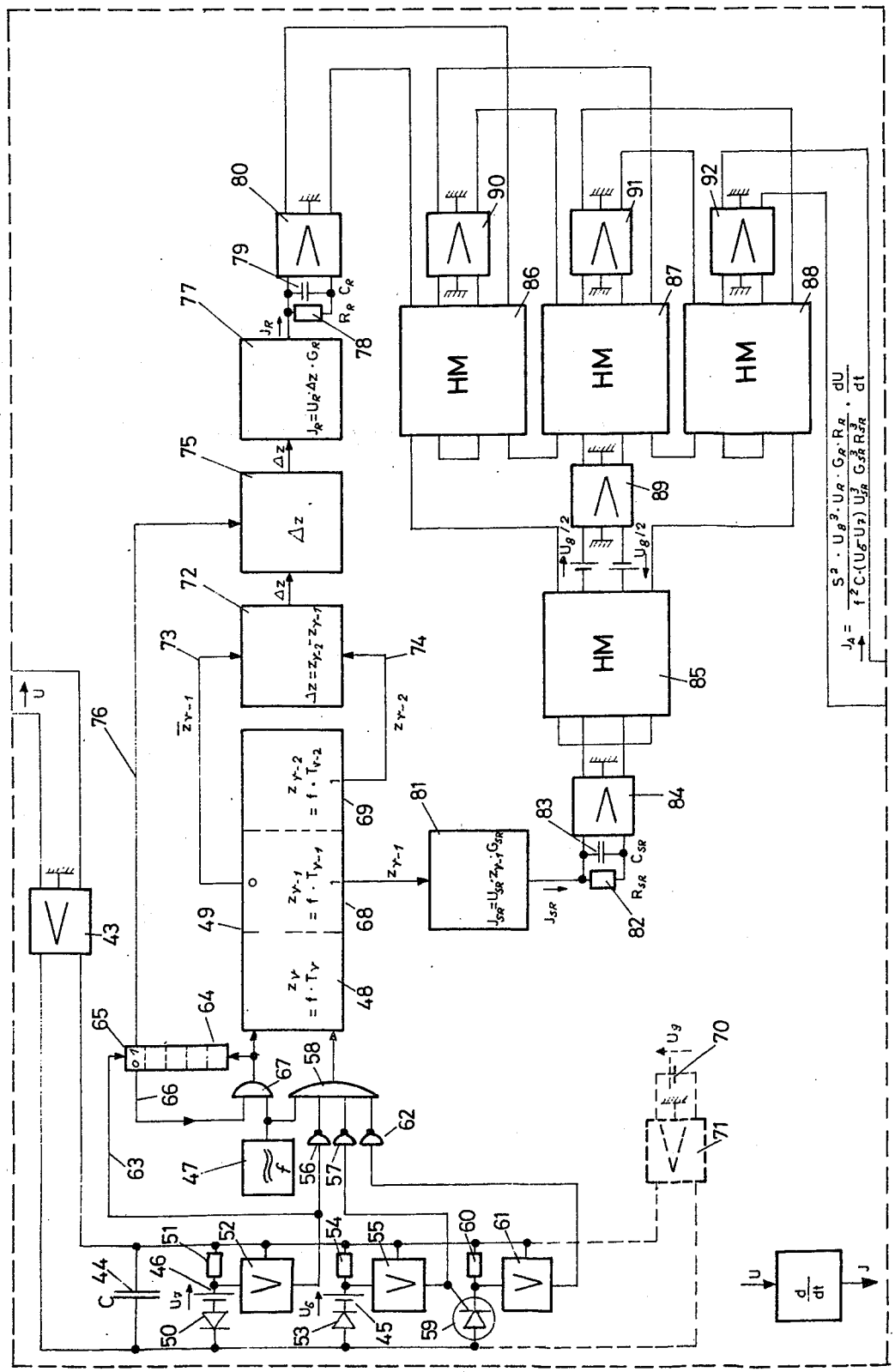

METHOD OF AND AN APPARATUS FOR CONTROLLING THE QUANTITY OF FILTER AID FED TO A SEDIMENTATION FILTER IN A GIVEN UNIT OF TIME DURING FILTRATION

The invention relates to a method of controlling the quantity of filter aid fed to a sedimentation or settling filter during filtration by being admixed with the unfiltered feed in a given unit of time, and also to an apparatus for carrying out the method.

In the case of sedimentation or settling filters, it is known to dispose between the unfiltered stock chamber and the filtrate chamber carrier means pervious to liquid and onto which, prior to commencement of actual filtration, initially in a primary deposition phase, a layer of filter aid, in most cases kieselguhr, is deposited and onto which, then, during filtration, the sediment carried by the unfiltered material settles. The primary sedimentation layer forms thereby the actual filtering element while the carrier means serve only to support the primary sedimentation layer and the layer of sediment which collects on it. Where the term "commencement of filtration" or equivalent appears throughout in the specification and the appended claims, it is intended to refer to the beginning of the actual filtration operation subsequent to the formation of the primary settling layer which is a necessary preliminary to actual filtration in any settling layer system. Carrier means in the so-called layer filters are carrier plates provided with holes or slots or fine mesh wire nets and in the so-called candle filters substantially cylindrical filter candles suspended into the unfiltered material chamber from a carrier plate and having as a rule slot-shaped connecting passages between the outside of the candle which is towards the unfiltered substance and the interior of the candle which is connected to the filtrate chamber. These carrier means must withstand the pressure exerted on them by the primary sedimentation layer and particularly by the layer of sediment disposed above it and which results from the resistance of the fluid flowing through these layers. Since the sediment carrying capacity of the carrier means is limited and since, furthermore, only a limited delivery pressure is available, as a rule, on the feed side of the filter, care must be taken to ensure that the pressure drop through the layer of sediment, throughout the entire period of filtration, is maintained at or below a definite upper limit value established by the pressure loading capacity of the carrier means and/or the maximum delivery pressure on the feed side of the filter.

In order to maintain the pressure drop over the layer of sediment below this limit value throughout the entire filtration operation, filter aid, in most cases also kieselguhr, is usually admixed with the unfiltered feed throughout the entire filtering operation, becoming uniformly dispersed in the unfiltered substance and then settles in the layer of sediment together with the sediment. Thus, a loosening of the layer of sediment is achieved which substantially reduces the resistance to flow offered by the layer of sediment in comparison with the flow resistance of a layer of sediment free of added filter aid.

The loosening-up of the layer of sediment which is intended by the admixture of filter aid is, however, conditional upon the quantity of filter aid fed to the unfiltered substance in a given unit of time being sufficient for an effective loosening of the quantity of sediment fed to the filter by the unfiltered supply during the same unit of time. It is, of course, evident that no loosening-up of the layer of sediment can be expected if the quantity of filter aid supplied is only very minimal or negligible in relation to the quantity of sediment supplied. On the other hand, however, the quantity of filter aid applied per unit of time ought not to be too great in comparison with the quantity of sediment fed to the filter in the same unit of time and together with the unfiltered supply, because the height of the layer of sediment or, more accurately speaking, the total height of the primary sedimentation layer and layer of sediment, is limited in all the known sedimentation filters and in the event too much filter aid is supplied in a given unit of time, the layer of sediment would grow too quickly which, by virtue of the limited height of the layer of sediment, would shorten the period of filtration or reduce the total quantity of liquid filtered per batch. Therefore, the quantity of filter aid supplied per unit of time must be, within certain limits, in proportion to the quantity of sediment supplied in the unfiltered substance per unit of time if it is intended on the one hand effectively to loosen up the layer of sediment and on the other to avoid an excessively rapid build-up of sediment.

Hitherto, the quantity of filter aid fed to a sedimentation filter in a given unit of time during filtration was in many cases controlled by hand by the operator supervising the filtration. In principle, it was assumed that the filter would be operated at its rated capacity throughout the entire period of filtration and/or that the quantity of fluid passing through the filter in a given unit of time would not be substantially altered during the filtration period, with the result that the quantity of filter aid fed to the unfiltered subtance increased with the filter capacity, the ratio of the quantity of filter aid fed per unit of time to the filter capacity being dimensioned in accordance with predetermined empirical values. Naturally, since these empirical values are valid only for an average amount of sediment in the unfiltered supply, this form of control necessitated monitoring of the sediment level in the unfiltered material, i.e. the quantity of sediment contained in a given unit of volume of unfiltered supply, and a subsequent correction of the preset value of quantity of filter aid fed to the unfiltered supply in a given unit of time in the event of any deviation of the sediment loading of the unfiltered substance from the aforesaid average level. In the case of manually controlled sedimentation filters, a portion of transparent pipe constructed as an inspection glass was for this purpose incorporated into the line supplying unfiltered material, so that the operator could see the turbidity of the unfiltered material being supplied to the filter and in the event of intense cloudiness or above average sediment in the unfiltered material, could increase the amount of filter aid accordingly or, in the event of slight turbidity or below average levels of sediment in the unfiltered material, could correspondingly reduce the amount of filter aid dispensed. Therefore, in the case of manually controlled filters, at commencement of filtration, the operator would adjust a rate of filter aid supply corresponding to the said empirical value and would then, throughout the entire period of filtration and purely by visual monitoring, check the turbidity of the unfiltered material flowing through the aforesaid inspection glass and in the event of any deviation from the average, adjust the rate of filter aid supply accordingly. This rough system of manual control dependent upon many random factors could not, naturally, guarantee or more or less constant degree of loosening of the layer of sediment over the entire height of this new layer as it collected during filtration, nor that the quantity of filter aid per unit of volume of the sediment supplied to the filter together with the unfiltered material would remain more or less constant through the entire period of filtration. Because quite apart from the fact that even the basic assumption that a filter capacity remains constant over the entire period of filtration is generally not correct, the filter capacity instead normally diminishing gradually during filtration, the use of visual inspection in itself conceals a multitude of possible sources of error. Such a source of error lies in the evaluation of the turbidity of the unfiltered material by the human eye, because the eye perceives as clouding the difference in brightness between the light passing through the inspection glass and the light passing alongside the inspection glass, and this difference in brightness is dependent not only upon the level of sediment in the unfiltered material but also upon the strength of light from the light source or upon the mean brightness in the room, so that therefore, for example, for equal levels of sediment in the unfiltered material, the eye will perceive different levels of turbidity at different times of the day. What is more, physiological reasons such as, for example, fatigue, can lead to errors in perception. A particularly serious possibility of error in the case of simple visual inspection is, moreover, the fact that the operator only briefly checks the glass from time to time yet the dispersion of sediment in the unfiltered substance is as a rule not completely regular. Therefore, at such a brief inspection, the level of clouding of the unfiltered material which is just flowing through the inspection glass may be substantially lower than the average level of turbidity in the unfiltered substance being fed to the filter at that time, and if, by virtue of the low level of clouding seen in the inspection glass, the rate of filter aid is reduced, then until the next time the rate of admixture is corrected or until the next inspection of the glass, the extent of loosening of the layer of sediment will be substantially below what it should be.

For this and other reasons, with manual control and simply visual inspection, it can easily happen that the quantity of filter aid supplied to the filter in a period of time is too small in relation to the quantity of sediment fed to the filter in the same period of time together with the unfiltered feed so that by reason of this lack of filter aid, the topmost layer of sediment will be virtually impervious to fluid by reason of its having been inadequately loosened, and continued filtration will be impossible. In such cases, it is said that the filter is clogged. In the event of such clogging, filtration must be discontinued and can be resumed only after the filter has been cleaned and after fresh primary sedimentation. such a discontinuance of filtration, before the proper time, leads to considerable losses because the prematurely discontinued batch results firstly, in a reduction in the ratio of effective working time to total working time of the filter and, secondly, in an increase in the proportion of dilution losses to the quantity of fluid filtered during the batch. In order to exclude as far as possible the danger of such a premature discontinuance of filtering, therefore, when the filter aid is dispensed under manual control, with purely visual inspection, then even if visual inspection shows only a very slight turbidity in the unfiltered substance, it is usual never to go below the empirical value applicable to mean turbidity of the unfiltered substance and furthermore, if there is intense cloudiness in the unfiltered substance, the tendency is mostly to increase the rate of filter aid admixed beyond the necessary level, i.e. with manual control and simple visual inspection. Hence, the general tendency is to overdispense the filter aid which, first of all, means a substantial excess consumption of filter aid and, secondly, by reason of the limited height of the layer of sediment and the more rapid growth of the layer of sediment which follows on from overdispensing of the filter aid, results in a diminution of the normal period of filtration and, consequently, an increase in the ratio of dilution losses to the quantity of fluid filtered per batch.

In order to avoid the aforesaid disadvantages of manual control and simple visual inspection, in the case of a known method of the type mentioned at the outset, the turbidity of the unfiltered substance fed to the filter was continuously measured by means of a suitable measuring device and the rate of dispensing of filter aid automatically controlled as a function of the result of such measurement. Thus, the above-mentioned possibilities of error occasioned by purely visual inspection were substantially excluded. In particular, the continuous measurement of turbidity permitted of constant direct adaptation of the rate of filter aid supply to the degree of turbidity at a given time, so avoiding the overdosing of filter aid which, with manual control and purely visual inspection, was necessary in order to exclude the risk of premature discontinuance of filtration.

Nevertheless, however, even with this method, the risk of clogging of the filter due to underdosing of filter aid could not be entirely ruled out. Furthermore, even with this method, it was possible under certain circumstances for filter aid to be overdispensed, with the disadvantages this entailed. The main reason for this is that between the clouding of a liquid and the sediment content of this liquid, there is no clear physical relationship. For example, the light permability of a liquid can be substantially reduced even by a dyestuff which is soluble in the liquid and thus, particularly with an automatic the measuring device, the impression of intense turbidity in the liquid can be created without the liquid actually containing any sediment. Accordingly, turbidity in the unfiltered feed is decided not only by its content of matter in suspension but, for example, also the colour of the sediment and all the other properties of the sediment which influence permeability to light, and it should thus be clear that clouding of the unfiltered substance measured as in the known method could nt provide any clear indication of the level of turbidity in the unfiltered feed. Only if the sediment carried by the unfiltered substance was always constant qualitatively, i.e. in its material composition, was it possible for the device measuring the turbidity to be calibrated to the sediment content of the unfiltered material in a given range of measurement, but any variation in the material composition of the sediment then immediately produced an error in measurement and thus an incorrect dispensing of filter aid. Furthermore, such a variation in material composition of the sediment could additionally be associated with a variation in the physical properties of the overall sediment composition in terms of its perviousness to liquid with insufficient loosening-up by filter aid. In other words, a variation in the material composition of the sediment could, in the case of the known method, and under unfavourable circumstances, firstly produce a lessening in the rate of filter aid admixture and then, by reason of the reduced amount of admixed filter aid and a particularly low rate of perviousness to liquid in the new composition of sediment, if insufficiently loosened up, a clogging of the filter. Application of the known method was therefore only possible in the case of a substantially constant composition of the sediment and therefore, logically speaking, only where identical liquids were filtered and where also the conditions for producing the unfiltered feed were constantly the same. In addition to this restriction of its range of application, the known method also has the fundamental disadvantage that even if one started from the premise of a constant composition of sediment and if the measured turbidity was therefore a clear indication of the sediment content of the unfiltered substance in the range of measurement, measuring the turbidity in the unfiltered substance in the measurement range could not produce a magnitude corresponding to the quantity of sediment fed to the filter per unit of time but a magnitude corresponding to the sediment content per unit of volume of the unfiltered substance. That is, the known method only works properly if, in addition to the above-mentioned prerequisite of constant composition of sediment, also the basic assumption mentioned, i.e. the filter operating in fact at its rated output over the total period of filtration, is true. If there are fluctuations in filter performance of quantity of liquid flowing through the filter in a given unit of time, i.e. in the event of a temporary lowering of the performance of the filter to a fraction of its rated performance, then in the case of the known method, the quantity of filter aid per unit of time remained the same as needed for full rated performance of the filter. Therefore, if for example, the filter performance drops to half its rated capacity, there will be an overdispensing of filter aid to the extent of double the amount actually needed. It is true that such occasional instances of overdosage of filter aid do not have any substantial disadvantages so long as the filter is generally operated at its raged performance and if the filter performance drops briefly only from time, to time because then over-dosages of filter aid only occur during the brief phases of diminution and the resultant excess usage of filter aid is relatively small. If the diminution of filter performance is not based on external causes but on a build up of unfiltered substance in the filte caused, for example, by an insufficiently loosened up layer of sediment, then such an overdosage of filter aid may even be advantageous because it will produce an increased loosening up of the newly-sedimented layers and will thus counteract the cause of the build up. On the other hand, such an overdose of filter aid is always a disadvantage if for a relatively large part of the total filtration time, the filter runs at substantially less than its rated capacity and only at its rated capacity from time to time, i.e. if the filter performance fluctuates greatly during filtration, because then in order to avoid clogging of the filter during operation at rated filter performance, the dosage of filter aid must be adjusted to the dosage required at rated performance, which necessarily leads to an overdosage of filter aid during a considerable part of the filtration time, with all the disadvantageous consequences of overdosage which have already been explained earlier in connection with manual control. Certainly if only a fraction of the rated filter performance is utilised over the entire filtering period, then naturally the disage of filter aid can be adjusted to a corresponding fraction of the dosage needed at rated performance.

All in all, therefore, the method and procedure hitherto applied to control the quantity of filter aid fed to a sedimentation filter during filtration, for a given unit of time, could not reliably exclude the possibilities of either the occurrence of clogging of the filter or the resultant need for premature discontinuance of filtration nor overdosage of filter aid with the disadvantageous consequences arising therefrom.

The invention, then, was based on the problem of providing a method of the type mentioned at the outset and alo an apparatus for carrying out this method, with which it is possible to achieve an ever-correct dosage of filter aid by adapting itself automatically to changing working conditions with virtually complete exclusion of the aforesaid risk of filter clogging.

According to the invention, in the case of a method of the type mentioned at the outset, this is achieved by determining a first magnitude or value which is a linear function of the pressure drop over the sedimentation filter and a second magnitude or value which is dependent upon the quantity of liquid flowing through the sedimentation filter per unit of time, and adjusting the quantity of filter aid fed to the unfiltered substance in a given unit of time in proportion to a third magnitude or value which is dependent upon the ratio of the first magnitude to the second magnitude and/or to variations in this ratio with respect to time.

The present method is based on the perception that the dosage of filter aid is determined only by the resistance of flow in the layer of sediment, or the pattern of this flow resistance in relation to time and formed by the sedimented layer of suspended matter and proportional to the ratio of the pressure drop over the layer of sediment to the quantity of liquid flowing through the layer of sediment per unit of time. This is because the resistance to flow reflects not only the quantity of sedimented matter but also the degree of loosening up of the sedimented layer by the filter aid distributed in the layer of sediment and, in particular, also the physical properties of the sedimented matter in terms of perviousness to liquid at the existing degree of loosening.

Comparative tests by the Inventor have confirmed this perception and revealed that the above-mentioned problems can be entirely resolved by a system of controlling the dispensing of filter aids based on the time pattern of the flow resistance. Not only can clogging of the filter and overdosage of filter aid be avoided but, in addition, it is possible to achieve a substantial reduction in consumption of filter aid and at the same time a considerable increase in the total quantity of liquid filtered per batch plus an increase in the ratio of effective working time to total working time of the filter and a reduction in the proportion of dilution losses per batch to the total quantity of liquid filtered per batch.

In the case of the present method, it is expedient to measure the pressure of liquid both on the unfiltered feed side and also on the filtrate side of the filter and to determine as the first magnitude a value which is a linear function of the difference between the two measured values. It is however also possible, and in terms of technical complications in measuring the pressure drop over the filter, quite possibly more advantageous, to measure only the liquid pressure on the unfiltered feed side of the filter, the liquid pressure on the filtrate side of the filter being fixed at an at least approximately constant value, preferably at least approximately equal to atmospheric pressure, and as a first magnitude, to determine a value which is a linear function of the measured value of the liquid pressure on the unfiltered feed side of the filter.

In the case of a layer filter with a plurality of filter elements compressed together into one filter assembly and having a supply tube from which the unfiltered feed is distributed over the individual filter elements and a discharge tube in which the filtrate flowing from the individual filter elements is collected, in the present method, the pressure of liquid on the unfiltered feed side is expediently measured in the supply pipe and the liquid pressure on the filtrate side is expediently measured in the discharge pipe. As mentioned above, however, it is possible also to measure only the pressure of liquid on the unfiltered feed side in the supply pipe and in order to maintain an at least approximately constant pressure of liquid on the filtrate side, to connect the discharge pipe to a pressure equalising apparatus, preferably a pressure compensating tank with a gas buffer at virtually constant gas pressure above a variable level of liquid. In the case of a candle filter with a filter chamber and a carrier plate sub-divided in the interior of the chamber and a plurality of filter candles suspended from the carrier plate, the liquid according to the present method is measured on the unfiltered feed side, ideally in the part of the chamber interior which forms the unfiltered feed chamber, below the carrier plate, while the liquid pressure on the filtrate side is ideally measured in the part of the chamber interior above the carrier plate which forms the filtrate chamber. Here, too, it is possible to measure just the liquid pressure on the unfiltered feed side and in order to maintain an at least approximately constant level of fluid pressure on the filtrate side, to exert a substantially constant pressure on the filtrate, preferably by a gas at more or less constant gas pressure.

In the case of a first preferred form of embodiment of the present method, the first magnitude is proportional to the pressure difference between the unfiltered feed and filtrate side of the filter, less a predetermined pressure value. Th predetermined pressure value can expediently be so selected that the pressure difference between unfiltered feed and filtrate side of the filter less this pressure value corresponds at least approximately to the mean pressure drop over the layers of sediment mixed with filter aid which are deposited during filtration, and the first magnitude is thus at least approximately proportional to the mean pressure drop over the layers of sediment. Ideally, for this purpose, after completion of primary sedimentation at the commencement of filtration, and for a predetermined quantity of liquid flowing through the filter per unit of time, the first magnitude is set at zero, ideally at the rated performance of the filter. The predetermined pressure value can, however, advantageously also be so chosen that it corresponds at least approximately to the sum of the pressure differences between unfiltered feed and filtrate side of the filter substantially independent of the rate of throughput through the filter in a given time, the first magnitude being thus at least approximately proportional to the sum of all the other pressure differences between unfiltered feed and filtrate side of the filter which vary with changes in the quantity of throughput through the filter over a period of time, including the pressure drop over the layers of sediment which have settled during filtration. If, in the case of the previously explained first preferred embodiment of the present method, the pressure of liquid on the filtrate side is kept at least approximately constant while only the pressure of liquid on the unfiltered feed side is measured, then the first magnitude is proportional to the measured value of liquid pressure on the unfiltered feed side of the filter less the sum of the said predetermined pressure value and of the constant value of liquid pressure on the filtrate side.

In the case of a second advantageous embodiment of the present method, the first value is proportional to the pressure difference between unfiltered feed and filtrate side of the filter. If in this embodiment the pressure of liquid on the filtrate side is at least approximately constant and only the pressure of liquid on the unfiltered feed side is measured, then the first value is proportional to the measured value of liquid pressure on the unfiltered feed side of the filter reduced by the constant value of liquid pressure on the filtrate side.

In the present method, the first value may advantageously be an electrical signal, preferably a voltage or a current. In this case, for measuring the liquid pressure, it will be expedient to use a pressure converter, preferably an electrical pressure converter provided with strain gauge strips which convert the pressure values to be measured into corresponding values of an electrical signal.

With the present method, it is ideal to form as a second value a value proportional to the mean rate of flow at a measuring point in the filtrate line leading away from the filter or in the unfiltered supply feed to the filter, or a value proportional to the time integral of this rate of flow. The second value can thereby likewise advantageously be an electrical signal, preferably a voltage or a current. For measuring the rate of flow, it is expedient to use a flow converter, preferably an inductive flow meter which converts the values of mean rate of flow which are to be measured into corresponding values of an electrical signal. To achieve a stable flow at the point of measurement; it is advantageous to provide upstream of the measuring point an inlet zone and following it an outlet zone having at least in the vicinity of the measuring point but preferably over its entire length, the same flow cross-section as at the point of measurement.

For creating the third value from the first and second value, there are two different ways open within the framework of the present method: the third value, and thus the rate of filter aid dosage proportional to it, may be made dependent either upon the total resistance to flow in the layer of sediment or only the differential increase in the flow resistance in the layer of sediment. Both methods have their particular advantages so that according to the particular instance of use, one or other of the ways may be the more suitable. So far, extensive experimental investigations conducted by the inventor have failed to reveal that one of the two methods has any clear advantage over the other, although theoretically the method whereby dosage of filter aid is made dependent upon the differential increase in resistance to flow would appear to promise a dosage of filter aid responding more precisely to the level of turbidity of the unfiltered feed at any given time and thus more suitably adapted to brief fluctuations in the level of suspended matter in the unfiltered feed.

Where the first method is concerned, the premise is adopted that for constant composition of sediment and filter aid and thus a constant degree of loosening of the sedimented matter, the resistance to flow offered by the layer of sediment increases in proportion to the quantity of sediment deposited. The quantity of deposited sediment is, however, proportional to the product of the mean quantity of sediment per unit of volume of the unfiltered feed and the quantity of liquid which is filtered in toto since the commencement of filtration. Accordingly, therefore, for a constant proportion of the quantity of filter aid fed to the filter per unit of time to the quantity of sediment fed to the filter per unit of time, the resistance to flow increases in proportion to the product of the quantity of sediment per unit of volume of unfiltered feed times the quantity of liquid filtered in toto since the commencement of filtration. The proportion of flow resistance to the entire quantity of liquid filtered since the commencement of filtration is therefore, subject to constant composition of sediment and filter aid, proportional to the quantity of sediment per unit of volume of unfiltered supply. Since, the flow resistance, as mentioned above, is proportional to the ratio of the pressure drop over the layer of sediment to the quantity of liquid flowing through the layer of the sediment per unit of time, the ratio of pressure drop over the layer of sediment to the product of the quantity of liquid flowing through the layer of sediment per unit of time and the total quantity of liquid filtered since commencement of filtration, for constant composition of sediment and filter aid, is proportional to the quantity of sediment per unit of volume of unfiltered feed. As a result, the ratio of the pressure drop over the layer of sediment to the total quantity of liquid filtered since commencement of filtration, for constant composition of sediment and filter aid, is proportional to the product of the quantity of liquid flowing through the layer of sediment per unit of time and the quantity of sediment per unit of volume of unfiltered feed or, in other words, proportional to the product of the volume of unfiltered feed fed to the filter per unit of time and the quantity of sediment per unit of volume of unfiltered feed and thus therefore proportional to the quantity of sediment fed to the filter per unit of time. In order to respect the above-mentioned prerequisite of a constant ratio between the quantity of filter aid fed to the filter per unit of time and the quantity of sediment fed to the filter per unit of time, consequently the quantity of filter aid fed to the filter per unit of time must be made proportional to the ratio of the pressure drop over the layer of sediment to the total amount of liquid filtered since the commencement of filtration. With such a dosage of filter aid, a substantially even loosening up of the sediment over the entire layer will be obtained. The degree of loosening up is thereby determined by the factor of proportionality between the quantity of filter aid fed to the filter or unfiltered feed per unit of time and the ratio of the pressure drop over the layer of sediment to the total quantity of liqud filtered since the start of filtration.

For the alternative form of the present method, wherein the previously explained first way of creating the third value from the first and second values is utilised, it is accordingly characteristic that the second value increases as a linear function of the total quantity of liquid filtered from the commencement of filtration while the third value is proportional to the quotient, i.e. rating of the first to the second value.

To determine the second value, it is thereby expedient to create a fourth magnitude or value which is proportional to the quantity of liquid flowing through the sedimentation filter per unit of time and from the fourth value, by integration thereof with respect to time commencing at the commencement of filtration and after completion of primary sedimentation, there results a fifth value or magnitude proportional to the total quantity of liquid filtered with effect from the commencement of filtration and from this fifth value, can be obtained the second value which rises as a linear function thereof. The fifth value can thereby advantageously be so created from the fourth value by means of a capacitor of predetermined capacitance which is charged to a predetermined condenser voltage in constant sequence with a charging current proportional to the fourth value, and then discharged again in a small discharge time which is negligible in relation to the charging time, these charging operations being counted from the commencement of filtration onwards and a value proportional to the number of charging operations since commencement of filtration giving the fifth value.

In the case of the aforementioned alternative of the present method, corresponding to the above-mentioned first form of embodiment of the present method, if the first value is made proportional to the pressure difference between the unfiltered feed and filtrate side of the filter less a predetermined pressure value and if, after completion of primary sedimentation at commencement of filtration, for a predetermined quantity of liquid flowing through the filter per unit of time, preferably at rated performance of the filter, the first value is adjusted to zero, then the second value has to be made proportional to the said fifth value so that the third value is at least approximately proportional to the ratio of the mean pressure drop over the layers of sediment to the total quantity of liquid filtered from the commencement of filtration onwards. In this case, the quantity of filter aid fed to the unfiltered supply per unit of time must be made proportional to the third value only after completion of an initial phase of filtration and a rigidly predetermined quantity of filter aid per unit of time fed to the unfiltered feed during the initial phase of filtration in which both the mean pressure drop over the layers of sediment and also the already filtered quantity of liquid are still virtually zero so that the third value, at approx. 0 : 0 has an undefined or greatly fluctuating value. If such an initial phase of filtration with feeding of a rigidly predetermined quantity of filter aid per unit of time is to be avoided, then in accordance with the above-mentioned second advantageous embodiment of the present method, the first value is to be made proportional to the pressure difference between unfiltered feed and filtrate sides of the filter and if when forming the second value, such a procedure is adopted that the second value is obtained by addition of a constant sixth magnitude or value to the fifth value and if the value of the sixth magnitude is so selected that the value of the third magnitude at commencement of filtration lies with a predetermined range, the lwer limit of which corresponds to a minimal rate of filter aid dosage while its upper limit corresponds to a maximum dosage of filter aid. The amount of the sixth value at commencement of filtration is thereby preferably so adjusted that the third magnitude has a value which lies at least approximately in the middle of the said range.

In the case of the aforesaid alternative form of the present method, the third value can be expediently formed by division of the first value by the second. If thereby the first to fifth or sixth values are analogue electrical signals, preferably direct current voltages and/or direct current, then two Hall multipliers linked together with an amplifier to constitute a quotient former may advantageously be used for making the division.

In the case of the second of the above-mentioned two ways of forming the third value from the first and second values, in principle, the differential increase in flow resistance is determined in a time differentiation and from this is derived the quantity of matter sedimented during the time differential and the quantity of filter aid fed to the unfiltered supply per unit of time is then made proportional to the ratio of this quantity of sediment to the length of the time differential. Similarly to the above-mentioned first method, it is taken as a premise that there is a definite functional relationship between the flow resistance and the volume of sedimented matter, for constant composition of sediment to filter aid and thus a constant degree of loosening of the sedimented layer of matter. For example in the case of sedimentation filters having flat carrier means for supporting the layer of sedimented matter, such as layer filters, there should be a linear relationship and in the case of sedimentation filters having cylindrical carrier means for the sedimented layer, such as candle filters, there should be a logarithmic relationship. From this relationship, it is possible to determine the volume of the sedimented matter as a function of the measured resistance to flow. For example, the volume of sediment, subject to the said proviso of constant composition of sediment and filter aid, in the case of sedimentation filters having flat carrier means, is a linear function and in the case of sedimentation filters having cylindrical carrier means an exponential function of the flow resistance. The increase in volume of the layer of sediment per unit of time arises then from the time-related derivation of the dependency of the volume of the layer of sediment upon the resistance to flow. For example, the growth in volume of the layer of sediment per unit of time in the case of sedimentation filters with flat carrier means such as layer filters, is proportional to the time-related derivation of the flow resistance or to the variation in flow resistance in the same unit of time and in the case of sedimentation filters having cylindrical carrier means such as candle filters, proportional to the time-related derivation of the said exponential dependency of the volume of the layer of sedimentation upon the flow resistance or to the product of the variation in flow resistance in the same unit of time and the aforesaid exponential dependency. In order to maintain the above-mentioned condition of constant ratio of the quantity of filter aid fed to the filter per unit of time to the quantity of sediment fed to the filter per unit of time, then, the quantity of filter aid fed to the filter per unit of time has to be made proportional to the increase in volume of the layer of sediment per unit of time and thus therefore proportional to the time-related derivation of the dependency of the volume of the sediment layer upon the flow resistance. Since as mentioned above the flow resistance is proportional to the ratio of the pressure drop over the layer of sediment to the quantity of liquid flowing through the layer of sediment per unit of time, it is evident that the quantity of filter, aid fed to the filter or to the unfiltered feed, per unit of time must be made proportional in the case of sedimentation filters with flat carrier means such as layer filters, to the increase in the ratio of pressure drop over the layer of sediment, or over the filter, to the quantity of liquid flowing in the same unit of time through the layers of sediment or through the filter, and in the case of sedimentation filters having cylindrical carrier means such as candle filters, proportional to the product of the increase in the said ratio in the same unit of time and a factor which is exponentially dependent upon the aforesaid ratio.

For the alternative form of the present method in which the previously explained second method is used for forming the third value from the first and second values, it is in contrast characteristic that the second value is proportional to the quantity of liquid flowing through the sedimentation filter per unit of time and the third value proportional to the time-related derivation of a seventh value dependent upon the ratio of the first value to the second. The seventh value is thereby, in the case of sedimentation filters having flat carrier means such as layer filters, a value which is a linear function of the ratio of the first value to the third and in the case of sedimentation filters having cylindrical carrier means such as candle filters, an exponential function of the ratio of the first value to the second.

The formation of the time-related derivative of this seventh value, which is dependent upon the ratio of the first value to the second, is in the case of the present method subject to certain difficulties in that the ratio of the first value to the second, or the flow resistance in the layer of sedimentation which is proportional thereto, varies only very slowly. Filtration normally lasts several hours, in most cases more than 6 to 8 hours, and the flow resistance of the sedimentation layer during this time gradually rises from the flow resistance of the primary sedimentation to the flow resistance of the full height of the layer of sediment including the primary sedimentation layer. The ratio of the flow resistance of the entire sedimentation layer at the end to that at commencement of filtration is as a rule between 50 : 1 and 10 : 1, so that for example with a filtration time of approx. 7 hours, only a relative increase in flow resistance of between 2 and 0.4 per mil will occur per second. Such a minimal increase can be hardly ascertained practically, because the measured value would then be less than the disturbance variables to be taken into consideration. It is true that in course of time, these interference variables cancel one another out, but control of the dosage of filter aid would then no longer be mainly dependent upon the measured value but mainly upon the value of the constantly changing disturbance variables at a given moment. i.e. there would be a constantly fluctuating rate of admixture of filter aid. In order to prevent this, it is expedient to integrate the measured value over a certain period of time, for example of the order to 1 to 2 minutes, because the integral of the measured value grows in this length of time to a relatively large and easily measurable amount, while the disturbance variables cancel one another out, on average, and cannot therefore in practice produce any error in the result of integration. By dividing the result of integration by the integration time, it is possible then to obtain the mean of the measured value during the integration time. In order to be able to carry out such integration, though, the measured value must be available as a constant analogue magnitude so that the disturbance variables cancel one another out in time.

For the above-mentioned reasons, it is in the case of the alternative of the present invention which corresponds to the said second possibility, expedient to form the third value from the seventh value in that in constant sequence the period of time necessary for charging a capacitor or predetermined capacitance from a first to a second potential value of capacitor voltage with a charging current which is a linear function of the seventh value, is determined and in each case the last and penultimate period of time determined are stored and as a third value proportional to the time related derivation of the seventh value, a value is formed which is proportional to the ratio of the difference between the penultimate and the last determined period of time or to the product of the penultimate times the square of the last period of time determined. In order to determine the period of time needed to charge the capacitor from the first potential value to the second, the pulses of a predetermined pulse sequence frequency which fall within this period of time may be counted and for this pulse counting process and for storing the last and penultimate periods of time determined and furthermore for forming the difference between the penultimate and last period of time determined, digital switching means may be employed, preferably a three-stage shift register with a first stage for pulse counting and a second and third stage for storing the pulse counts of the last and penultimate periods of time determined and, connected to the second and third stages of the shift register, an adding network for forming the difference between the pulse counts stored in these two stages. It is expedient thereby in each case via the duration of time in a pulse counting process, to convert the pulse count of the last period of time determined and the pulse count differential formed from the stored impulse counts for the penultimate and last period of time determined, into analogue values and to use analogue switching means, preferably an analogue computer comprising four Hall multipliers and at least three amplifiers to form from the two analogue values the third value which is proportional to the ratio of the said pulse count difference to the third power of the pulse count representing the last period of time determined. Instead of this, however, it is possible also advantageously, always at the commencement of the pulse count, to derive from the stored pulse counts $z_{\nu-2}$ and and $z_{\nu-1}$ for the penultimate and last periods of time determined by digital computer means, preferably comprising an adder network for forming $\Delta z = z_{\nu-2} - z_{\nu-1}$ and a computer mechanism with a divider circuit for forming $1/z_{\nu-1}$ or $1/z_{\nu-2}$ and $1/z_{\nu-1}$ and a multiplier circuit for forming $(1/z_{\nu-1})^3 \cdot z$ or $(1/z_{\nu-1})^2 \cdot 1/z_{\nu-2} \cdot z$, the result being a numerical value corresponding to the ratio $(z_{\nu-2} - z_{\nu-1})/z_{\nu-1}^3$ or $(z_{\nu-2} - z_{\nu-1})/(z_{\nu-2} \cdot z_{\nu-1}^2)$, which can then be stored in each case until commencement of the next pulse counting process, the third value proportional to this numerical figure being formed from the stored numerical value, preferably by conversion into a corresponding analogue value.

Preferably, in the case of the alternative to the present method, which corresponds to the aforesaid second way, particularly for dosage of filter aid in the case of layer filters, the seventh value is made proportional to the ratio of the first value to the second and for forming the third value from the first and second values, firstly by division the seventh value proportional to the quotient of the first value to the third and from this, then, the third value is formed which is proportional to the time linked derivation thereof. Advantageously, thereby, the first to third and the seventh values may be analogue electrical magnitudes or signals, preferably direct current voltages and/or direct currents, and for the division, two Hall multipliers may be used which are linked together with an amplifier to constitute a quotient former.

If the alternative of the present method which corresponds to the said second way is used for dosage of filter aid in the case of sedimentation filters having cylindrical carrier means for the sedimentation layers, particularly in the case of candle filters, then a particularly good adaptation of filter aid dosage to the layer of sediment which are likewise cylindrical in form, can be achieved where the seventh value is at least approximately proportional to $(e^{\alpha-\beta} - \gamma)$ in which $e$ is the base of the natural logarithms, $\alpha$ is an exponent proportional to the ratio of the first value to the second, $\beta$ is a constant preferably equal to 0 and $\gamma$ is a constant preferably equal to 1, and in order to form the third value from the first and second values, an eighth value $(\alpha - \beta)$ which is a linear function of, or which is proportional to, the quotient of the first value to the second is first formed by division and with this the seventh value which is at least approximately proportional to $(e^{\alpha-\beta} - \gamma)$ and from the seventh value, then, the third value is formed which is proportional to the time related derivation thereof. For forming the seventh value from the eighth value, thereby it is expedient for a plurality of values proportional to the integral powers of the eighth value to be formed and added together, the proportionality factors being so selected that $e^{\alpha-\beta}$ is approximated by a power series $$e^{\alpha - \beta} \approx \sum_{\nu = 0}^{n} \frac{(\alpha - \beta)^\nu}{\nu!}$$

which is broken off after the $n$th term, the seventh value which is a linear function of or proportional thereto being formed from the sum. Ideally, thereby, $n$ may equal 2 or 3 and $\beta$ may equal $\alpha_o$ and $\alpha_o$ may equal the value of the exponent $\alpha$ for the ratio of first value to second value existing at the commencement of filtration and the eighth value may be adjusted to zero for adjustment of $\beta$ to $\alpha_o$ at commencement of filtration after completion of primary sedimentation. It is thereby advantageous for the first to third and for the seventh and eighth values to be analogue electrical magnitudes, preferably direct current voltages and/or direct currents, and for the division, to use Hall multipliers linked together with an amplifier to constitute a quotient former and for the approximation of $e^{\alpha-\beta}$ by the power series discontinued after the $n$th term, to use an analogue computer circuit with $(n - 1)$ Hall multipliers and at least $n$ amplifiers.

The filter aid can in the case of the present method, be expediently supplied to the unfiltered feed in the same way as with the known methods, through a liquid line, preferably discharging into the unfiltered feed line to the sedimentation filter, and a dispensing pump, in the form of a filter aid suspension in a suspension liquid, preferably a suspension of kieselguhr in water, with a constant mixing ratio of the quantity of filter aid per unit of volume of suspension liquid and uniform dispersion of the filter aid in the suspension liquid, from a mixture tank serving to produce and prepare the suspension. In order to control the quantity of filter aid fed to the unfiltered feed in a given unit of time, in this case the time mean value of the rate of delivery from the dispensing pump is made proportional to the third value. Preferably, filter aid suspension is fed continuously to the unfiltered supply with a dispensing pump of constantly variable delivery, the delivery of the dispensing pump varying in proportion to the third value. Ideally, this can be achieved either with a dispensing pump having a constant or permanently adjusted delivery stroke driven by a motor of constantly variable rotary speed, the rotary speed of the motor being varied in proportion to the third value, or a dispensing pump having a constantly variable volume of delivery driven by a motor at constant rotary speed, the volume of delivery from the dispensing pump being varied in proportion to the third value. Instead, it is however advantageous also to feed filter aid suspension intermittently to the unfiltered feed with a dispensing pump of constant delivery, which is switched on or actuated periodically, the product of the switch-on sequence frequency and the period of switch-on being made proportional to the third value. This latter can expediently be achieved either where the period of switch-on is constant and the switch-on sequence frequency is made proportional to the third value or the switch-on sequency frequency is constant and the period of switch-on is made proportional to the third value.

With the last-mentioned form of control of the quantity of filter aid fed to the unfiltered supply per unit of time by periodically switching on a dispensing pump which has a constant rate of delivery and a constant switch-on sequence frequency and a period of switch-on which is proportional to the third value, it is possible to achieve a particularly advantageous example of embodiment of the above-mentioned alternative form of the present method which corresponds to the said first way. In this example, according to the likewise above-mentioned first preferred form of embodiment of the present method, the first value is proportional to the pressure difference between the unfiltered feed and filtrate side of the filter less a predetermined pressure value and, after completion of primary sedimentation, at commencement of filtration, the first value is adjusted to zero, the second value being obtained by integration with respect to time of a fourth value which is proportional to the quantity of liquid flowing through the sedimentation filter per unit of time, integration commencing at the beginning of filtration, a rigidly predetermined quantity of filter aid being fed to the unfiltered feed per unit of time during an initial phase of filtration. From commencement of filtration, every time the dispensing pump is switched on, preferably at the moment of switch-on, the amount of the fourth value at that instant is fed to an adding memory in which it is added to the already stored value so that in the adding memory a second value is formed which is proportional to the entire quantity of liquid filtered with effect from the commencement of filtration, and immediately after the feeding of the value for the fourth magnitude at that moment to the adding memory, a digital electronic computer determines from the instantaneous values of the first value and the second value which is available in the adding memory and after completion of the said initial phase of filtration, the duration of switch-on of the dispensing pump is made proportional to the instantaneous value of the third magnitude determined at the relevant time preferably by means of a backwards counter set to the instantaneous value of the third magnitude.

The invention furthermore relates to an apparatus for carrying out the present method, which is characterised by pressure measuring means for determining the pressure drop over the sedimentation filter and for forming the first value which is a linear function of the pressure drop, filter performance measuring means for determining the quantity of liquid flowing through the sedimentation filter in a given unit of time, means for forming the second magnitude which is dependent upon this time-related quantity of liquid, calculating means for forming the third magnitude from the second and first values, which is dependent upon the ratio of the first to the second value and/or the time related variation in this ratio, a filter aid dispensing means having a dispensing output which is variable in its time-related mean, for dispensing the quantity of filter aid fed to the unfiltered feed side par unit of time, and for feeding the filter aid to the unfiltered feed side, filter aid storage means for supplying the dispensing means with filter aid and control means for controlling, in proportion to the third value, the time related mean of the dispensing output from the filter aid dispensing apparatus.

The invention is explained in greater detail hereinafter with reference to examples of embodiment shown in the attached drawings, in which.

Figure 2:
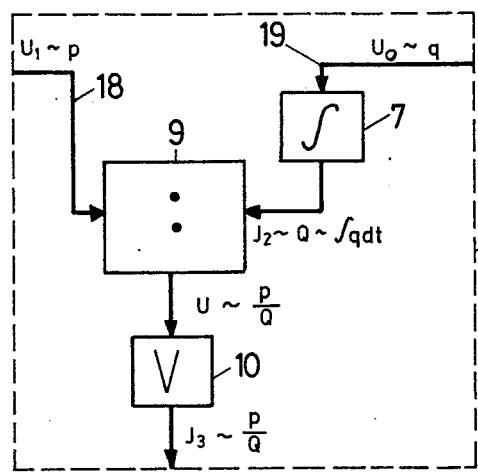
FIG. 2 is a diagrammatic representation of the construction of the calculator unit in FIG. 1 for the alternative form of the present method which corresponds to the aforesaid first way.
Figure 3:
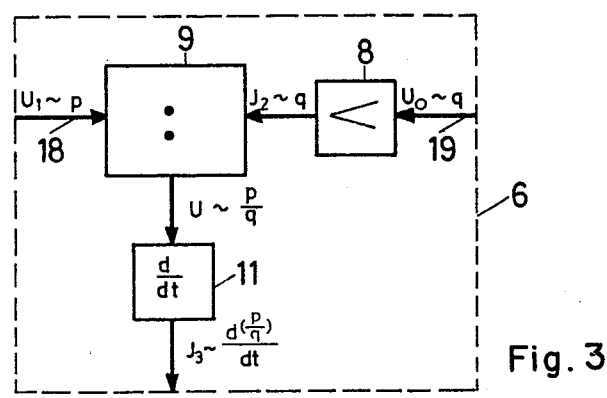
FIG. 3 is a diagrammatic representation showing the construction of the calculator unit 6 in FIG. 1 for the alternative form of the present method which corresponds to the said second way and a filter aid dosage arrangement with sedimentation filters having flat carrier means.
Figure 12:
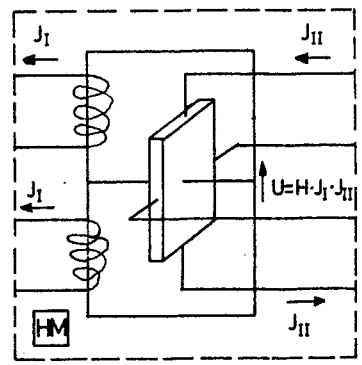
Figure 4:
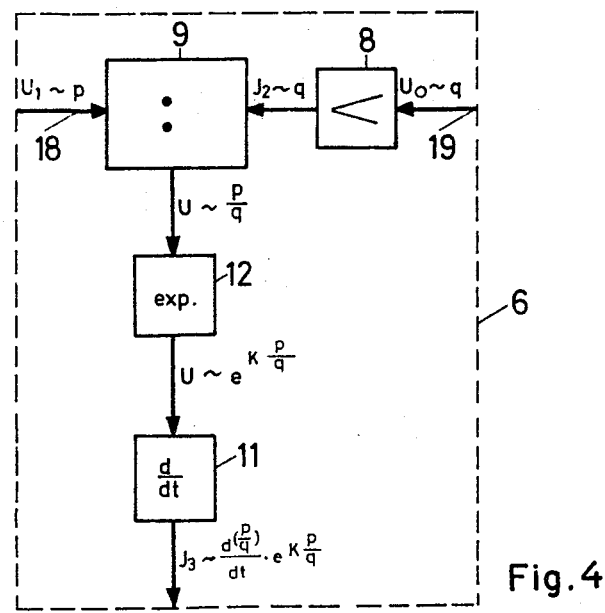
FIG. 4 is a diagrammatic representation of the construction of the calculator unit 6 in FIG. 1 for the alternative form of the present method corresponding to the said second way and a filter aid dispensing arrangement with sedimentation filters having cylindrical carrier means.
Figure 13:
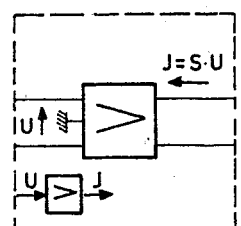
Figure 11:
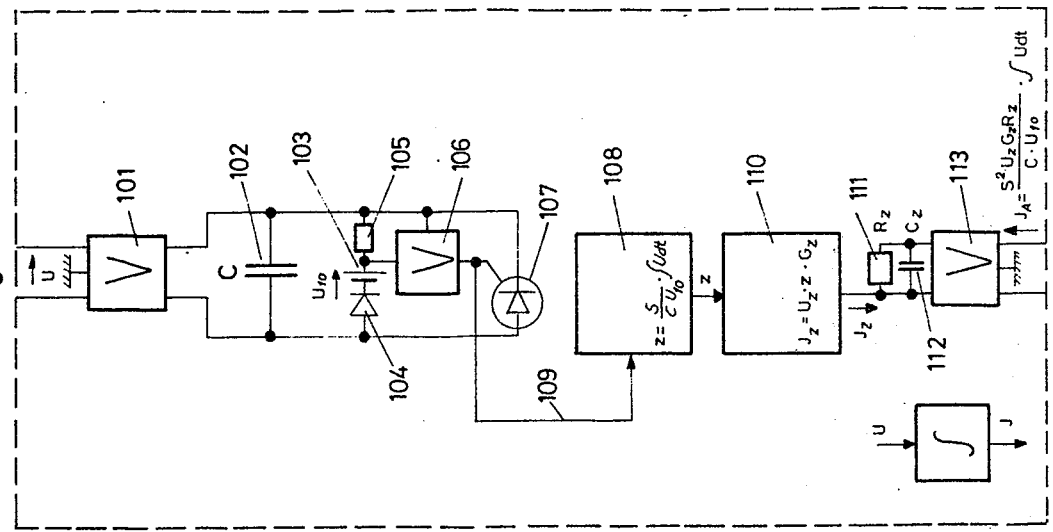
Figure 10:
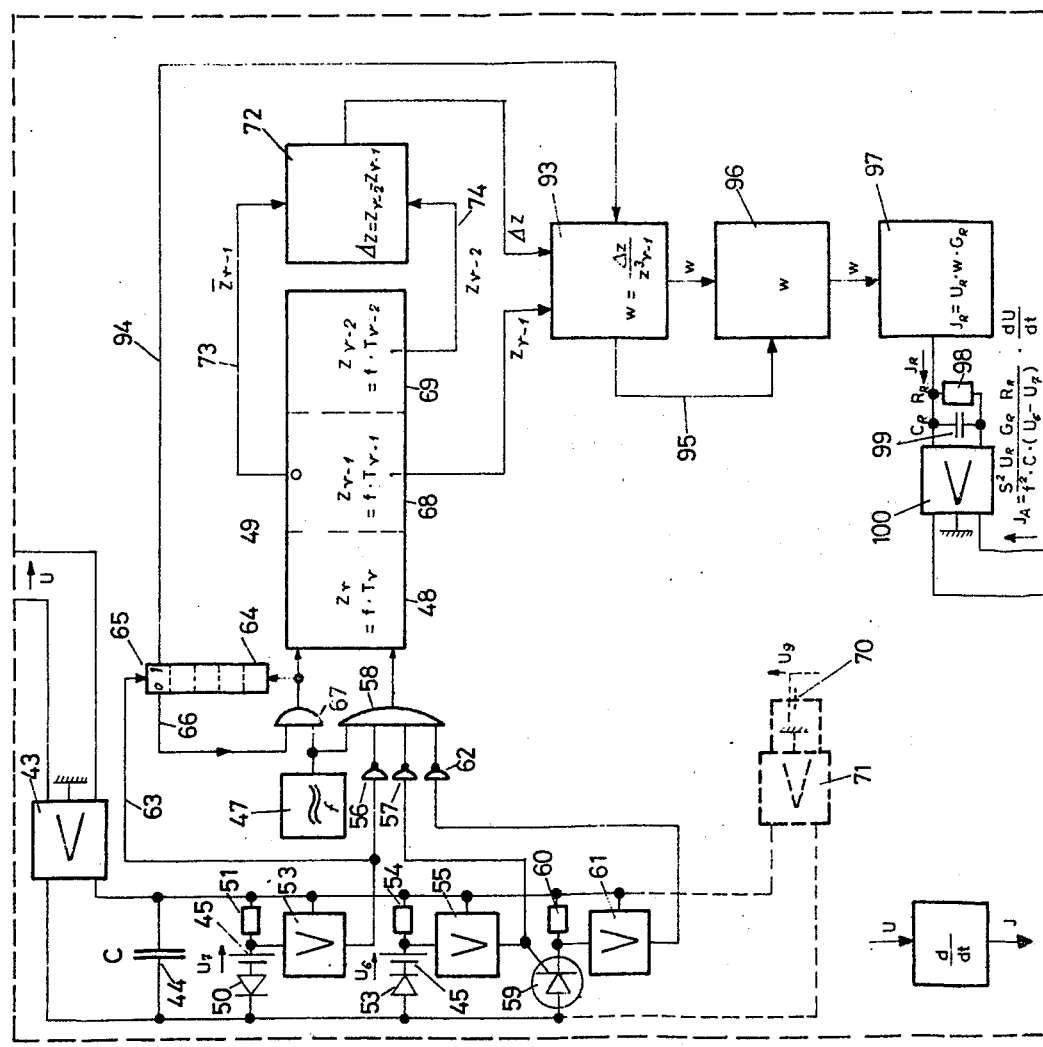

FIGS. 9 and 10 each show an example of embodiment of internal construction of the differentiating circuit 11 shown in FIGS. 3 and 4, which forms the time related derivative of the input magnitude;

FIG. 11 shows an example of embodiment of internal construction of the integrator 7 in FIG. 2 which forms the time integral of the input magnitude;

FIG. 12 is a diagram showing the internal construction of the Hall multipliers HM in FIGS. 5 to 7 and 9, and FIG. 13 is a diagrammatic view of the amplifiers shown in FIGS. 2 to 11, indicating the amplifiers from input to output.

Figure 1:
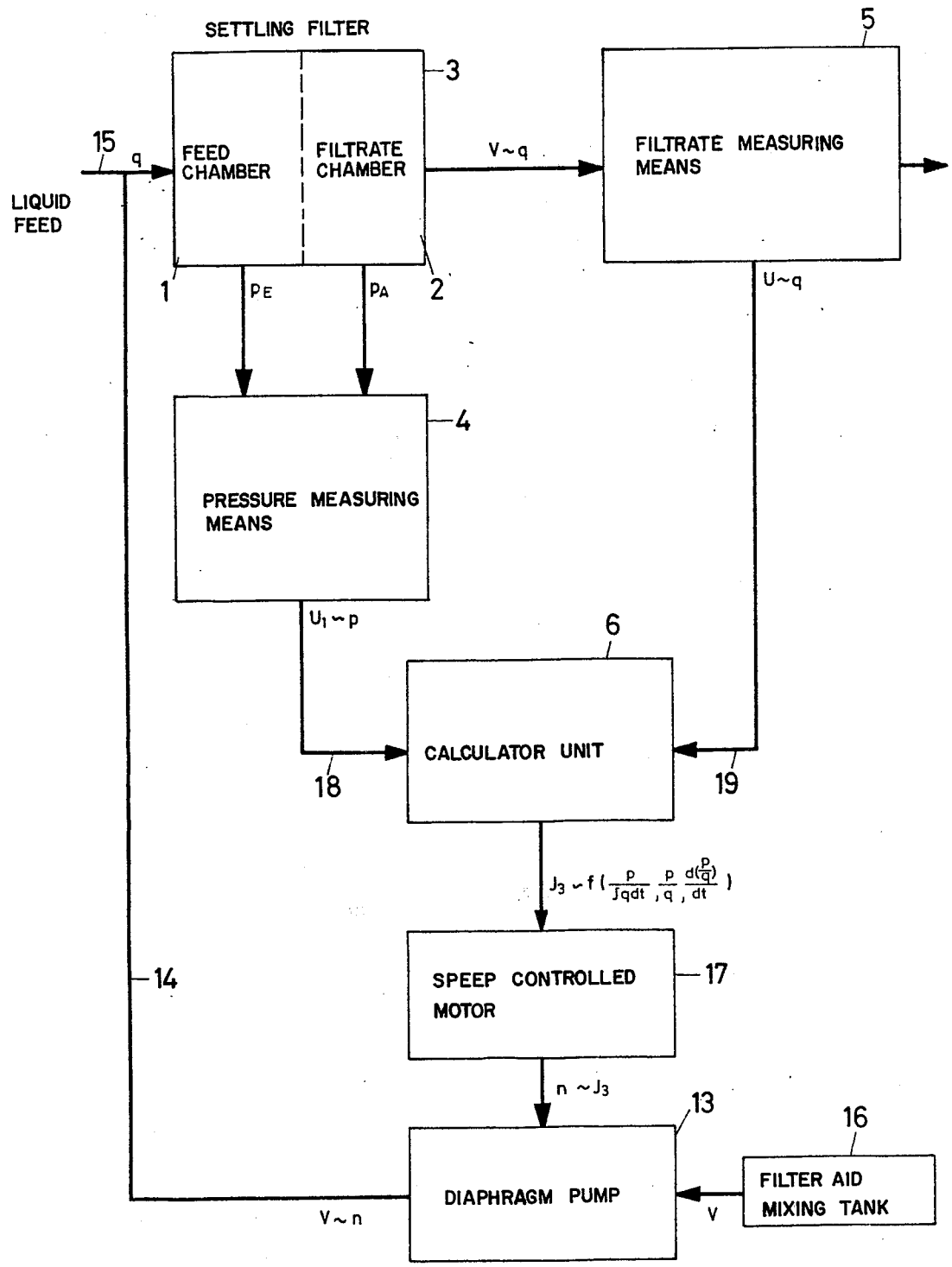
FIG. 1 is a block diagram of an example of embodiment of apparatus for carrying out the present method.

The diagram in FIG. 1, showing an apparatus for carrying out the present method comprises, in addition to the sedimentation filter 3 which is sub-divided into unfiltered feed chamber 1 and filtrate chamber 2, pressure measuring means 4 for determining the pressure drop $(p_E - p_A)$ over the sedimentation filter 3, arising out of the pressure difference between the liquid pressure $p_E$ in the unfiltered feed chamber 1 and the liquid pressure $p_A$ in the filtrate chamber 2, and for forming a first magnitude $U_1 \sim p \sim (p_E - p_A - p_o)$, which is a linear function of the pressure drop $(p_E - p_A)$, filter performance measuring means 5 for determining the quantity of liquid $q$ flowing through the sedimentation filter 3 per unit of time, by measuring the flow rate $v$ of the filtrate flowing out of the filter 3 in a predetermined flow cross-section and for forming a magnitude $U_o \sim q$ which is proportional to this time related quantity of liquid $q$, a calculator unit 6 having means 7, 8 (see FIGS. 2 to 4) for forming the second magnitude $I_2 \sim Q \sim \int q \, dt$ (see FIG. 2) or $I_2 \sim q$ (see FIGS. 3 and 4) which is dependent upon the time related quantity of liquid $q$ and calculating means 9, 10, 11 and 12 (see FIGS. 2 to 4) for forming the third magnitude $I_3 \sim p/Q$ (see FIG. 2) or $I_3 \sim d(p/q)/dt$ (see FIG. 3) or $I_3 \sim d(p/q)/dt \cdot e^{k \cdot p/q}$ (see FIG. 4) which is dependent upon the ratio of the first value to the second value and/or the time related variation in this ratio; a filter aid dispensing means 13, 14 having, variable in a time related average, a dispensing performance for dispensing the quantity of filter aid fed to the unfiltered feed in a given unit of time, which can take the form of a diaphragm pump 13 connected on its output side through a feed line 14 to the unfiltered feed line 15 to the filter 3 and having a time related volume of delivery $V \, n$ proportional to the rotary speed $n$ of its driving motor; filter aid storage means 16 for supplying the dispensing means 13, 14 with filter aid, in the form of a mixing tank 16 for producing and storing a suspension of kieselguhr and water and with a constant ratio of mixture of the quantity of kieselguhr per unit of volume of water; and control means 17 for controlling, in proportion to the third magnitude $I_3$, the time related means dispensing output $V \sim n \sim I_3$ of the filter aid dispensing means 13, 14 in the form of a rotary speed controlled drive motor 17 for the diaphragm pump 13 with control current $I_3$ of proportional speed $n \sim I_3$.

With the exception of the block 6, the construction of all the blocks shown in FIG. 1 is known.

For example, pressure measuring means such as in block 4 are known, with which the pressures $p_A$ and $p_E$ in the unfiltered feed chamber and in the filtrate chamber can be measured and converted into analogue electrical values. e.g. direct current voltages or currents of a magnitude proportional to the pressure of alternating current voltages for currents of amplitude proportional to the pressure, e.g. electric pressure converters or so-called pressure measuring cells. If two such known pressure converters are used for measuring the two pressures $p_A$ and $p_E$, then it is expedient to use two identical pressure converters and to subtract the electrical values supplied by them from each other, e.g. by serial connection in the case of voltages or by feeding to a common conductor in the case of currents. However, also known are pressure converters with two pressure connections which determine the difference between the pressures to which the two pressure connections are exposed, converting the measured pressure difference into an analogue electrical magnitude. In any event, measuring equipment for measuring the pressure drop over a filter or the pressure difference between the liquid pressures obtaining in the unfiltered feed chamber and in the filtrate chamber of the filter and which convert the readings into a corresponding electrical value belong to the generally known state of the art where sedimentation filters are involved. In many cases, already the currently used sedimentation filters are equipped with means for measuring the pressure drop over the filter and for indicating it electrically. The above-mentioned first magnitude $U_1 \sim (p_E - p_A - p_o)$ which is a linear function of the pressure drop over the filter can be obtained from the electrical magnitude proportional to the pressure drop $(p_E - p_A)$, for example by subtraction of an equivalent constant or permanently adjustable electrical value corresponding to the value of $p_o$. If, as is possible particularly in the case of the above-explained second way of forming the third value, the value $p_o$ is chosen as nil, then naturally the electrical value proportional to the pressure drop and supplied by the known measuring means can be directly used as the first value.

Likewise, too, filter performance measuring means as in block 5 for determining the quantity of liquid flowing through the filter in a given unit of time by measuring the rate of flow $v$ of the filtrate flowing out of the filter in a predetermined cross-section of flow and for forming an electrical value proportional to this time related quantity of liquid belong to the generally known state of the art, already applied in many existing filter installations. Filter performance measuring means of this type are for example the so-called inductive flow meters in which the rate of flow of the (electrically weakly conductive) filtrate is determined by means of a magnetic field at right-angles to the direction of flow, from the voltage generated according to the law of induction at right-angles to the direction of flow and to the magnetic field, the product of the rate of flow and the induction of the magnetic field.

Filter aid dispensing means with a dispensing output variable in a time related mean, for dispensing the quantity of filter aid fed to the unfiltered feed per unit of time are a necessary constituent of all known sedimentation filters. As a rule, in the case of the known sedimentation filters, and as in block 13, the filter aid dispensing means consist of a diaphragm pump in which the dispensing output, variable in a time related mean, is achieved either as in block 13 by varying the rotary speed of the driving motor of the diaphragm pump, while the pump has a constant volume of delivery, or by varying the volume of delivery of a diaphragm with a constant rotary speed of the pump, or also by periodic switching-on or actuation of the pump having a constant switch-on sequence frequency and variable duration of switch-on or a constant switch-on duration and variable switch-on sequence frequency while the pump has a constant volume of delivery and the pump driving motor has a constant rotary speed. For practical reasons, namely in order to be able to use commercially available polyphase current motors as the driving motors, certainly in the case of most known sedimentation filters, in order to obtain a time related mean variable dispensing output, means for periodically switching on or for varying the volume of delivery of the pump are provided. In the case of equipment for carrying out the present method, such as the equipment shown in a block diagram in FIG. 1, on the other hand, the use of a rotary speed controlled motor as in block 17 is more advantageous from the point of view of control, because it does permit the dispensing output to be controlled directly or without any time lag, in keeping with the value of the third magnitude $I_3$, but for example for already existing sedimentation filter systems which it is intended subsequently to equip with apparatus functioning according to the present method, the control system can also be adapted to any other principles of controlling dispensing output which may be applied in the case of known sedimentation filters. Such an example in which the dispensing output, variable in a time related mean, is achieved by periodic switching on of the dispensing pump of constant switch-on sequence frequency and variable switch-on duration, has already been mentioned above within the framework of explaining advantageous forms of embodiment of the present method.

As a rotary speed controlled motor with the control variable of proportional speed $n$ as in block 17, it is possible to use either a direct current shunt-wound motor, in which the current through the field coil is made constant, a voltage proportional to the third magnitude $I_3$ being applied to the armature winding or the commutator, or a commercially available asynchronous motor in conjunction with a static, e.g. thyristor-controlled, frequency converter may be used, whereby then the output frequency of the frequency converter is made proportional to the third magnitude $I_3$ and the asynchronous motor is operated at the variable frequency supplied by the frequency converter. It goes without saying that also all other commercially available motor sets having a variable rotary speed proportional to an input variable may be used for the block 17 of the apparatus shown in FIG. 1.

In the same way as the previously mentioned filter aid dispensing means, filter aid storage means for supplying the dispensing equipment with filter aid are a necessary constituent part of all known sedimentation filters. As in block 16, as a rule the filter aid storage means in the case of the known sedimentation filters consist of a mixing tank for making up and storing a kieselguhr-water suspension with a constant ratio of mixture in respect of the quantity of kieselguhr per unit of volume of the water.

The foregoing remarks with regard to the apparatus shown in FIG. 1 show that means as in the blocks 4, 5, 13, 16 and 17 are generally known where sedimentation filters are concerned and therefore require no further explanation at this point. There are even sedimentation filter installations already in operation which are provided with means of measuring the pressure drop over the filter and the filtration performance, and which provide an electrical indication and in which also the dispensing output can be controlled by an electrical value (mostly an adjustable resistance or a potentiometer), the rate of dosage being in fact varied in most cases by periodic switching on with either a variable period of switching on or a variable switch-on sequence frequency, and in which therefore (by reason of the electrical indication), the input values for block 6 in FIG. 1 are already available and where the rate of dosage can be controlled on a basis of the output value of block 6 directly or with negligible adaptation. The present method is therefore verified substantially exclusively by the block 6 in FIG. 1 and for this reason the following remarks are confined to the internal structure of block 6 and the structure, mode of operation and co-operation of the component parts of block 6.

FIG. 2 shows the principle of construction of block 6 in FIG. 1 for the alternative form of the present method which corresponds to the above-mentioned first possibility. To the calculator unit shown in FIG. 2 are fed (a) via the control line 18 and serving as the said first value, a voltage $U_1 \sim p \sim (p_E - p_A - p_o)$ with $p_o \neq 0$ which is a linear function of the pressure drop $(p_E - p_A)$ above the sedimentation filter 3 and (b) via the control line 19, a voltage $U_o \sim q$ which is proportional to the quantity of liquid $p$ flowing through the sedimentation filter 3 per unit of time. In accordance with the above-mentioned first possibility, the third value which has to be formed from these two values or voltages is a value $I_3 \sim P/Q$ which is proportional to the ratio $P/Q$ of the mean pressure drop $p$ over the layers of sediment in the sedimentation filter 3 to the total quantity of liquid Q filtered since the commencement of filtration. This is achieved by adjusting, at commencement of filtration, the voltage $U_1$ to zero (so that therefore $p_o$ becomes equal to the pressure drop over the filter at commencement of filtration and formed mainly by the pressure drop over the primary sedimentation layer) and furthermore from the commencement of filtration onwards integrating the voltage $U_o$ in relation to time in the integrator 7 and the voltage $U_1$ is divided in the divider circuit 9 by the output value $I_2$ of the integrator 7 which is proportional to the time integral of the voltage $U_o$ and thus to the $\int q \, dt$ (or the total quantity of liquid Q filtered since the commencement of filtration). The output value $I_2$ of the integrator 7 forms thereby the repeatedly aforementioned second value. The divider circuit 9 provides as its output value a voltage $U \sim p/Q$ which is proportional to the ratio $p/Q$, which is then, in the amplifier 10, converted into the current $I_3 \sim p/Q$ which forms the said third value. The mean time related dosage or quantity of filter aid fed to the unfiltered supply per unit of time is then made proportional to this third value $I_3$, and in fact in the case of the example of embodiment shown in FIG. 1, by the current $I_3$ being fed to the rotary speed controlled motor 17 as a control variable. An adjustable current divider connected between the block 6 and the block 17 or built into the block 17 can thereby adjust the desired degree of loosening up of the layer of sediment or the quantity of filter aid fed to the filter per unit of volume of sedimented matter.

FIG. 3 shows the principle of construction of the block 6 in FIG. 1 for the alternative form of the present method which corresponds to the above-explained second possibility and a filter aid dispensing system for sedimentation filters having flat carrier means such as layer filters. In the same way as with FIG. 2, to the calculator unit shown in FIG. 3 are fed (a) via the control line 18 and serving as the said first value, a voltage $U_1 \sim p \sim (p_E - p_A - p_o)$ with $p_o \neq 0$ or $p_o = 0$ which is a linear function of the pressure drop $(p_E - p_A)$ over the sedimentation filter 3 and (b) through the control line 19 a voltage $U_o \sim q$ proportional to the quantity of liquid $q$ flowing through the sedimentation filter 3 per unit of time. Corresponding to the above-explained second possibility, the third value which is to be formed from these two values or voltages for the dispensing of filter aid in the case of sedimentation filters having flat carrier means, is a value $I_3 \sim d(p/q)/dt$ which is proportional to the time related derivative of the ratio $p/q$ of the pressure drop $p$ over the layers of sediment $(p_o \neq 0)$ or across the filter 3 $(p_o = 0)$ to the quantity of liquid $q$ flowing through the filter 3 per unit of time. This is achieved in that the voltage $U_o$ is converted by the amplifier 8 into the current $I_2 \sim U_o \sim q$ forming the second value and the voltage $U_1$ is divided in the divider circuit 9 by this current $I_2$ and then, in the differentiating circuit 11, a third value $I_3 \, dU/dt \sim d(p/q)/dt$ is formed which is proportional to the time related derivative of the output value $U \sim p/q$. The output voltage $U \sim p/q$ from the divider circuit 9 which is fed as an input voltage to the differentiating circuit 11 forms thereby the above-mentioned seventh value. The current $I_3 \sim d(p/q)/dt$ supplied by the differentiating circuit 11 then in the same way as explained above in connection with FIG. 2, controls the quantity of filter aid fed to the unfiltered feed in a given unit of time. For adjusting of the desired degree of loosening of the layer of sediment or the quantity of filter aid fed to the filter per unit of volume of sedimented matter, it is thereby likewise possible to provide a current divider which passes only an adjustable part of the output current $I_3$ from the differentiating circuit 11 as a control variable to the speed controlled motor 17, or equivalently acting switching means such as for example an adjustable voltage divider may be provided at the input of the output amplifier of the differentiating circuit 11.

FIG. 4 shows the principle of construction of the block 6 in FIG. 1 for the alternative form of the present invention which corresponds to the above-explained second possibility and a system of filter aid dosage for sedimentation filters having cylindrical carrier means such as candle filters. For the calculator unit shown in FIG. 4, in the same way as in FIGS. 2 and 3, there are fed (a) via the control line 18 and serving as the said first value, a voltage $U_1 \sim p \sim (p_E - p_A p_o)$ with $p_o \neq 0$ or $p_o = 0$ which is a linear function of the pressure drop ($p_E - p_A$) over the sedimentation filter 3 and (b) via the control line 19 a voltage $U_o q$ which is proportional to the quantity of liquid $q$ flowing through the sedimentation filter 3 per unit of time. In accordance with the above-explained second possibility, from these two values or voltages for filter aid dosage to sedimentation filters having cylindrical carrier means, it is necessary to form as a third value a value $$I_3 \sim \frac{d(e^{k \cdot p/q})}{dt} \frac{d(p/q)}{dt} \cdot e^{k \cdot p/q}$$

which is proportional to the time related derivative of an exponential function $e^{k \cdot p/q}$ with the ratio $p/q$ of the pressure drop above the layers of sediment ($p_o \neq 0$) or over the filter 3 ($p_o = 0$) to the quantity of liquid $q$ flowing through the filter 3 per unit of time. This is achieved by converting the voltage $U_o$, with the amplifier 8, into the current $I_2 \sim U_o \sim q$ which forms the second value and the voltage $U_1$ is divided by this current $I_2$ in the divider circuit 9. The output value $U p/q$ of the divider circuit 9 is then fed to the exponential amplifier 12 which on the output side provides a voltage $U \sim e^{k \cdot p/q}$ which is proportional to the said exponential function $e^{k \cdot p/q}$, and finally in the differentiating circuit 11, a third value $I_3 \sim d(p/q)/dt \cdot e^{k \cdot p/q}$ is formed which is proportional to the time related derivative of the output voltage $U \sim e^{k \cdot p/q}$ of the exponential amplifier 12. The output voltage $U \sim e^{k \cdot p/q}$ of the exponential amplifier 12 which is fed as an input voltage to the differentiating circuit 11 forms thereby the abovementioned seventh value. The current $I_3 \sim d(p/q)/dt \cdot e^{k \cdot (p/q)}$ provided by the differentiating circuit 11 then, in the same way as explained above in connection with FIGS. 2 and 3, controls the quantity of filter aid fed to the unfiltered feed per unit of time. As a rule, as already explained above, there are also possibilities for adjusting the desired degree of loosening of the layer of sediment or for adjusting the quantity of filter aid fed to the filter per unit of volume of sedimented matter.

Figure 5:
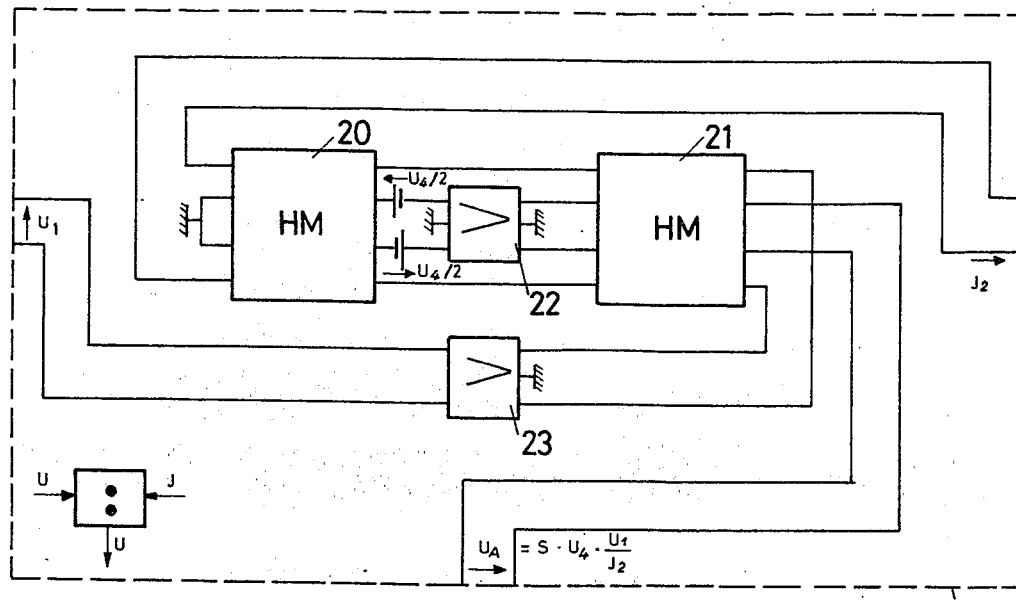
FIG. 5 is an example of embodiment of internal construction of the divider circuit 9 in FIGS. 2 to 4.

The divider circuit 9 in the calculator units shown in FIGS. 2 to 4 can expediently, as illustrated in FIG. 5, be constructed as analogue quotient formers. Such a construction of the divider circuit 9 in analogue form is required for the alternative form of the present method corresponding to the said second possibility, if in the differentiating circuit 11 as in the case of the differentiating circuits shown in FIGS. 9 and 10, prior to formation of the differential quotient, or more correctly stated of the difference quotient for eliminating disturbance variables, as already mentioned above, the mean of the value to be differentiated is formed over a certain time, because naturally the disturbance variables cancel themselves out over a time related mean only when analogous values are constantly available.

In the case of the calculator unit shown in FIG. 2 on the other hand, the divider circuit 9 may also take digital form, because at least in the embodiment shown in FIG. 11, the integrator 7 does in any event initially provide digital values which for further processing in an analogue divider circuit, as in FIG. 5, first have to be reconverted to analogue values within the integrator 7. Certainly, if the divider circuit 9 in FIG. 2 takes digital form, then naturally also the first value fed via the feed line 18 and proportional to $p$ must be a digital value which by reason of the fact that the known pressure measuring means usable for the block 4 generally supply analogue output values, would necessitate an analogue-digital converter in block 4 or between the block 4 and the divider circuit 9 in block 6.

The analogue divider circuit shown in FIG. 5 is built up from the two Hall multipliers 20 and 21 and the two operational amplifiers 22 and 23 as well as the stabilised direct current voltage source supplying the two partial voltages $U_4/2$. The operational amplifier 22 is an amplifier having a very high rate of amplification which for practical purposes can be regarded as infinite. In consequence, the input voltage of the operational amplifier 22, at finite values of its output current, can be extremely small, i.e. for practical purposes nearly nil. In consequence, for finite values at the output current of the amplifier 22, the output voltage of the Hall multiplier 20 for practical purposes needs to be equal to the oppositely directed direct current voltage $U_4$, and in fact regardless of the current $I_2$ fed to the divider circuit 9. Since, now, the Hall multiplier 20 as (FIG. 12 shows) supplies an output voltage $U = H \cdot I_I \cdot I_{II}$, where the proportionality constant H is proportional to the product of the current $I_2$ fed to the divider circuit 9 and the output current of the amplifier 22, the output current of the amplifier 22 must be inversely proportional to $I_2$, so that the product of $I_2$ and the output current of the amplifier 22 remains constant or an output voltage of the Hall multiplier 20 is maintained which is independent of the current $I_2$ and which corresponds to the constant direct current voltage $U_4$. The output current of the amplifier 22 therefore adjusts itself automatically so that its input voltage is virtually nil and the output voltage of the Hall multiplier 20 is thus for practical purposes equal to the oppositely directed direct current voltage $U_4$, i.e. to a value $U_4/H\ I_2$ which is inversely proportional to the current $I_2$, with proportionality factor $U_4/H$. Since the output current of the amplifier 22, as can be seen from FIG. 5 in conjunction with FIG. 12, prior to being fed to the Hall multiplier 20 flows through the Hall multiplier 21 and since, furthermore, as can be seen in FIG. 5 in conjunction with FIG. 13, the amplifier 23 feeds a current $I = S \cdot U_1$ to the Hall multiplier 21, the output voltage from the Hall multiplier 21 and thus the divider circuit in FIG. 5 is a voltage $U_4 = H \cdot U_4/H \cdot I_2 \cdot SU_1 = SU_4 \cdot U_1/I_2$, where the proportionality factor $SU_4$ is proportional to the ratio of the input voltage $U_1$ to the input current $I_2$ of the divider circuit.

The exponential amplifier 12 of the calculator unit shown in FIG. 4 must, for the reasons already explained in connection with the divider circuit 9, be an analogue amplifier if the divider circuit 9 in FIG. 4 is of the analogue type, because naturally the analogue output value from the divider circuit must also be amplified in analogue fashion so that it can be fed to the differentiating circuit 11 as an analogue input value.

Figure 6:
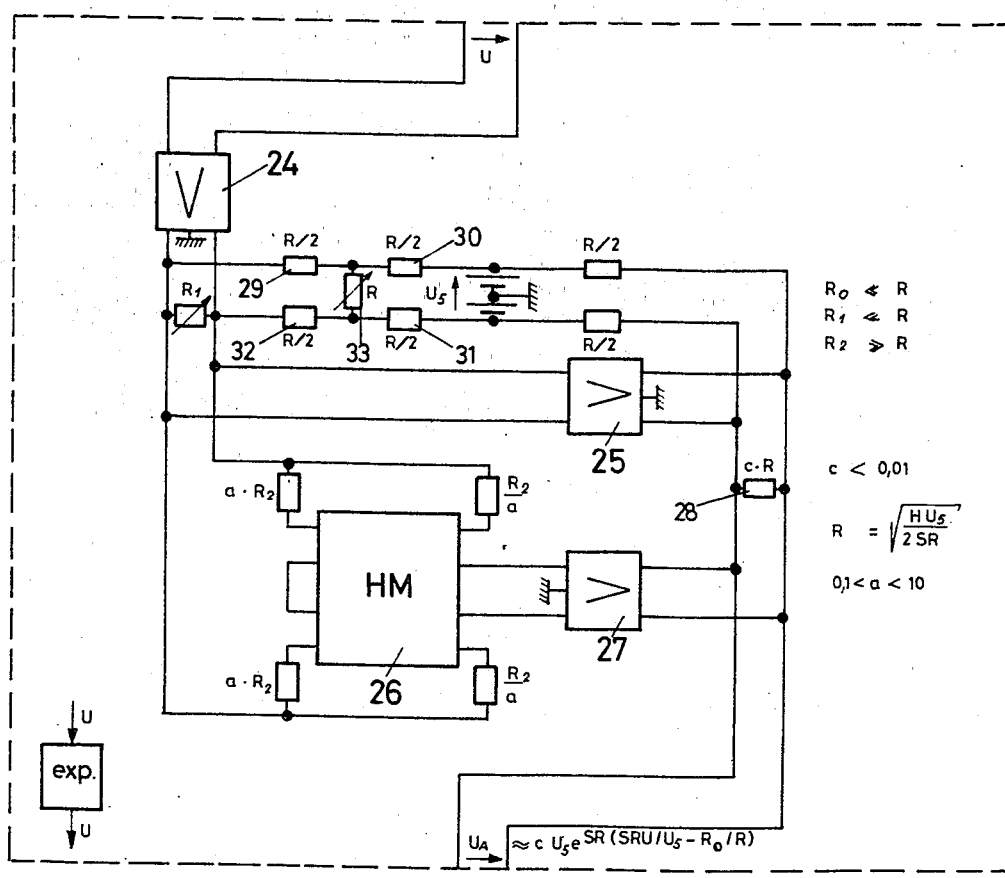
FIG. 6 is an example of embodiment of internal construction of exponential amplifier 12 in FIG. 4, with approximation of the exponential function by a power series broken off after the second term.
Figure 7:
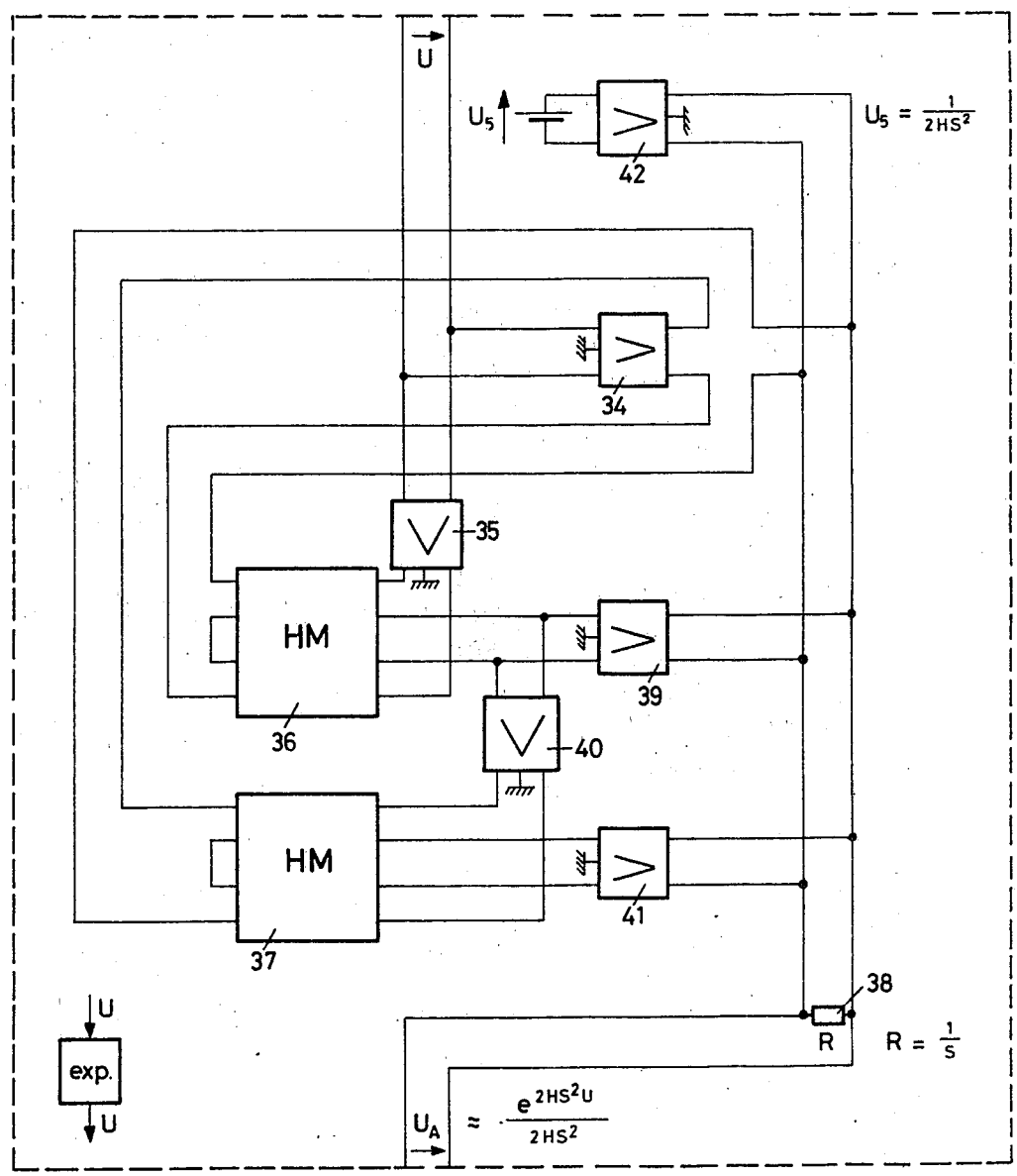
FIG. 7 shows an example of embodiment of internal construction of exponential amplifier 12 in FIG. 4 with approximation of the exponential function by a power series discontinued after the third term.

As an analogue exponential amplifier 12, it is possible to use either a commercially available exponential amplifier of known type which is provided for direct current amplification or one of the two exponential amplifiers shown in FIGS. 6 and 7. In the case of commercially available exponential amplifiers, the exponential range mostly extends over the several powers of ten, because there analogue exponential terms are used, but the accuracy of commercially available exponential amplifiers or agreement with a mathematically exact exponential pattern of output value over input value frequently leaves much to be desired. Particularly if, as in the present case, the required exponential range is relatively small, i.e. at about half a power of ten, although it requires the most exact possible exponential pattern over this range, a construction of exponential amplifier 12 as in FIG. 6 or 7, following a principle in which the exponential function is, in the manner already illustrated above, approximated by a power series discontinued after the $n$th term, is therefore in most cases more advantageous than the use of a commercially available exponential amplifier which is fitted with an analogue exponential term.

In the case of the exponential amplifier shown in FIG. 6, the exponential function is in principle replaced by a power series $e^x 1 + x + x^2/2$ which is broken off after the second term. From the input voltage U from the exponential amplifier in FIG. 6, the operational amplifier 24 firstly generates the current SU which is fed practically alone to the rheostat $R_1$, since the resistors R and $R_2$ in FIG. 6 are practically infinitely large, at about $R_1$ at every setting of $R_1$. Furthermore, the direct current voltage source $U_5$ feeds a current $U_5 \cdot R_o/R^2$ adjustable by the rheostat $R_o$ to the resistor $R_1$ and this flows in the opposite direction to the current supplied by the operational amplifier 24. At the rheostat $R_1$ therefore is the voltage $U_{R1} = R_1 \cdot (SU - U_5 \cdot R_o/R^2) = U_5/R_1 \cdot (SRU/U_5 - R_o/R)$. This voltage which is at $R_1$ is fed to the input of the operational amplifier 25 and furthermore through the resistances $a \cdot R_2$ and resistances $R_2/a$ drives the currents $U_{R1}/2aR_2$ and $U_{R1} \cdot a/2R_2$ flowing through the Hall multiplier 26. As a result, at the output of the operational amplifier, a current $S \cdot U_{R1}$ and at the output of the Hall multiplier 26 a voltage $H \cdot (U_{R1}/2aR_2) \cdot (U_{R1} \cdot a/2R. H \cdot U_{R1}^2/4R_2^2$ is generated. The output voltage of the Hall multiplier 26 is amplified to the current $HS \cdot U_{R1}^2/4R_2^2$ in the operational amplifier 27. The output currents of the operational amplifier 25 and 27 generate together with the current $U_5/R$ supplied by the voltage source $U_5$, at the resistance 28, a voltage $$U_A = cR(U_5/R + S \cdot U_{R1} + HS \cdot U_{R1}^2/4R_2^2) = C U_5(1 + \frac{S \cdot U}{U_5/R} R_1 + \frac{H \cdot U_5/R}{S \cdot 2R_2^2} \cdot \frac{1}{2} \cdot (\frac{S \cdot U}{U_5/R} R_1)^2).$$

If, as in FIG. 6, $R_2$ is chosen as $R_2 = \sqrt{(HU_5/2SR)}$, then the output voltage $U_A$ from the exponential amplifier in FIG. 6 is $$U_A = cU_5(1 + \frac{S \cdot U}{U_5/R} R_1 + \frac{1}{2}(\frac{S \cdot U}{U_5/R} R_1)^2) \approx cU_5 \cdot e^{\frac{S \cdot U}{U_5/R} R_1}.$$

With the above-indicated value for the voltage $U_{R1}$, we therefore have $U_A \approx cU_5 \cdot e^{SR_1 \cdot (SRU/U_5 - R_o/R)}$. Since the exponential function is however only approximated by a power series which is discontinued already after the second term, when using the exponential amplifier shown in FIG. 6, at commencement of filtration, the resistance $R_o$ should be so adjusted that the voltage at the resistance $R_1$ and thus the exponent of the $e$-function becomes nil. As a result, the end value of the exponent of the $e$-function at completion of filtration which if $R_1$ is correctly adjusted, is in the range from 0.5 to 0.7, is diminished by an amount of about 0.1 to 0.2, which produces a substantial improvement in the accuracy of approximation of the $e$-function by the power series which is discontinued after the second term, since the error in approximation which for an exponent of 0.7 is 3%, is reduced to only 1.5% for an exponent of 0.5. Such an adjustment of the resistance $R_o$ is equivalent to, mentioned above in connection with FIG. 4, the feeding of a voltage $U_1 \approx p \approx (p_E - p_A - p_o)$ via the control line 18 to the calculator unit shown in FIG. 4, which is proportional to the mean pressure drop over the layers of sediment in the sedimentation filter 3 and to this end set at zero at commencement of filtration (so that therefore $p_o$ becomes equal to the pressure drop above the filter at commencement of filtration and formed in the main by the pressure drop above the sedimentation filter). Therefore the adjustment of the voltage $U_1$ at zero at commencement of filtration can be waived if at commencement of filtration the aforementioned adjustment of $R_o$ is performed. Conversely, however, if the voltage $U_1$ is adjusted to zero at the commencement of filtration, the said adjustment of $R_o$ becomes unnecessary and in this case the entire resistance network formed by the resistors 29 to 33 can be omitted from the exponential amplifier shown in FIG. 6. In this case, the output voltage $U_A$ from the exponential amplifier in FIG. 6 is $U_A \approx cU_5 \cdot e^{SR_1 \cdot SRU/U_5}$. In the case of the exponential amplifier shown in FIG. 6, the resistance $R_1$ is to be so adjusted that the exponent of the $e$-function at completion of filtration becomes equal to the ratio of the diameter of the sedimentation layer at completion of filtration to the diameter of the sedimentation layer at the commencement of filtration (i.e. to the diameter of the primary sedimentation layer).

As the foregoing remarks in connection with FIG. 6 show, in the case of the exponential amplifier in FIG. 6, the adjustment of $R_o$ at commencement of filtration (or an equivalent adjustment of the voltage $U_1$ to zero at commencement of filtration) is in practice undertaken only in order to achieve a greater accuracy of approximation of the $e$-function by the power series which is broken off after the second term. Since such an adjustment of the resistance $R_o$ (or of the voltage $U_1$) at commencement of filtration does however undoubtedly entail circumstances and (if adjustment is incorrect) also constitutes a possible source of error, then in most cases it is more advantageous to approximate the $e$-function by a power series which is not broken off until after the third term and in this way to achieve a greater accuracy, because thus it is possible completely to dispense with manual adjustments at filtration commencement such as the aforesaid adjustment of $R_o$ (or adjustment of the voltage $U_1$ to zero). The possibility of dispensing with such adjustments and thus therefore of using as a variable $p$ in FIG. 4 the pressure drop over the filter 3 instead of the mean pressure drop over the layers of sediment reduced by the more or less constant value $p_o$, arises in principle from the fact that such constant values as $p_o$ in the time related derivative are omitted in the differentiating circuit 11 or appear only as constant proportionality factors.

An exponential amplifier in which the exponential function is replaced by a power series which is broken off only after the third is shown in FIG. 7. The input voltage U of the exponential amplifier in FIG. 7 is fed to the two operational amplifiers 34 and 35 and produces for both operational amplifiers an output current SU. The output current SU of the operational amplifier 34 is fed via the two Hall multipliers 36 and 37 to the resistor 38. The output current SU of the operational amplifier 35 is fed to the Hall multiplier 36. With the two currents SU flowing through the Hall multiplier 36, there is at the output of the Hall multiplier 36 a voltage $HS^2U^2$ which is fed to the two operational amplifiers 39 and 40 and which at both operational amplifiers produces an output current $HS^3U^2$. The output current $HS^3U^2$ of the operational amplifier 39 is likewise fed to the resistor 38 and the output current $HS^3U^2$ of the operational amplifier 40 to the Hall multiplier 37. With the two currents SU and $HS^3U^2$ flowing through the Hall multiplier 37, there is at the output of the Hall multiplier 37 a voltage $H^2S^4U^3$ which is fed to the operational amplifier 41, producing an output current $H^2S^5U^3$ thereof. The output current $H^2S^5U^3$ of the operational amplifier 41 is likewise fed to the resistor 38. Furthermore, there is fed to the resistor 38 by the operational amplifier 42 a constant current $SU_5 = \frac{1}{2}HS$ which is brought about the constant voltage $U_5 = \frac{1}{2}HS^2$ which is available at the input of the operational amplifier 42. The currents $\frac{1}{2}HS$, SU, $HS^3U^2$ and $H^2S^5U^3$ fed to the resistor 38 by the operational amplifiers 42m 34m 39 and 41 produce at this resistor $R = 1/S$ and thus at the output of the exponential amplifier in FIG. 7 a voltage $$U_A = \frac{1}{S}(\tfrac{1}{2} HS + SU + HS^3U^2 + H^2S^5U^3)$$

$$= \frac{1}{2HS^2}(1 + 2HS^2U + 2H^2S^4U^2 + 2H^3S^6U^3)$$

$$= \frac{1}{2HS^2}(1 + 2HS^2U + \tfrac{1}{2}(2HS^2U)^2 + \tfrac{1}{4}(2HS^2U)^3)$$

$$\approx \frac{1}{2HS^2} \cdot e^{2HS^2U}$$

It is true that the power series, as can be seen produced by the exponential amplifier in FIG. 7 for approximation of the exponential pattern of its output voltage $U_A$ over the input voltage U does not correspond exactly to a power series which for approximation of an e-function $e^x \approx 1 + x + x^2/2 + x^3/6$, is broken off after the third term because in the case of the power series produced by an exponential amplifier in FIG. 7, the factor in the third term is not 1/6 but 1/4. However, by reason of this deviation, in the range of $2HS^2U$ in question, the error created in the power series by omission of the higher power terms incorporating powers above 3 is substantially compensated, so that the output voltage $U_A$ of the exponential amplifier in FIG. 7, up to values of the exponent $2HS^2U$ of 1.75 with an error of less than 1.4%, corresponds to the e-function which is to be approximated, $\tfrac{1}{2}HS2 \cdot e^{2HS^2U}$, whereas comparatively, in the case of the exponential amplifier in FIG. 6, such an accuracy is achieved only up to the values of the exponent of approx. 0.5. On account of this exponential pattern of the output voltage $U_A$ from the exponential amplifier in FIG. 7 over its input voltage U, which is almost accurate up to substantially higher values of the exponent, it is possible as stated, when using the exponential amplifier in FIG. 7, to forgo the zero adjustment at commencement of filtration which was explained in conjunction with FIG. 6.

Figure 8:
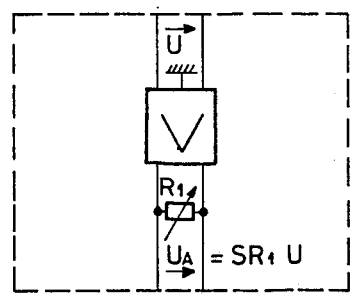
FIG. 8 shows an adjustable preamplifier for the exponential amplifier shown in FIG. 7.

For adjustment of the level of the input voltage U of the exponential amplifier in FIG. 7, it is expedient to provide upstream of it the adjustable preamplifier shown in FIG. 8, unless such an adjustment of the input voltage can be carried out from some other point in the wiring upstream of the exponential amplifier. The input voltage U of the exponential amplifier in FIG. 7 is in any event, for example by means of the resistor $R_1$ of the preamplifier in FIG. 8, to be so adjusted that the exponent $2HS^2U$ of the exponential function at completion of filtration, produced by the exponential amplifier in FIG. 7, is equal to 1.1 to 1.2 times the ratio of the diameter of the sedimentation layer at completion of filtration to the diameter of the sedimentation layer at commencement of filtration (i.e. therefore to the diameter of the primary sedimentation layer).

The differentiating circuit 11 in the calculator units shown in FIGS. 3 and 4 is, as already mentioned above, by virtue of the relatively slow rise in flow resistance in the sedimentation layer and, in contrast to this low rise, relatively high disturbance variables, ideally to be so constructed that from the input value of the differentiating circuit, firstly, over a certain period of for example one to two minutes, the time related mean is formed and from the difference between successive means and the period of time for forming the last mean, the differential quotient is then formed. For forming the time related mean of the input value of a differentiating circuit 11, it is necessary for an analogue input value to be fed to the differentiating circuit 11. Attention was of course already drawn to this in connection with the construction of the divider circuit 9 as an analogue quotient former and the use of an analogue exponential amplifier 12. The formation of the time related mean of this analogue input value of the differentiating circuit 11 is effected expediently, as already mentioned above, by integration of this input value over a certain period of time and division of the integration result by the integration time. Since for forming the said differential quotient the difference between the final and penultimate time related mean must be formed, the said time related mean values must be stored and since the difference between two such successive mean values is relatively small in comparison with the mean values themselves, it is not expedient to store these mean values in analogue memories, because when analogue means are used for storage purposes, it is virtually impossible to achieve sufficient constancy of the stored values because the storage error after expiration of the period of time taken to form one of the said mean values is negligibly small in relation to the difference between two successive mean values. For storing the said mean values, therefore, it is expedient to use digital storage means in the differentiating circuit 11, since with such means, even when storing values over a prolonged period of time, no storage errors of any kind occur. When using such digital storage means, in order to avoid errors when forming the difference between successive mean values, it is furthermore expedient also to form this difference by digital means. On the other hand, the said difference quotient can be formed from this difference and the duration of the last mean value formation may take place either, as in the case of the differentiating circuit shown in FIG. 9, by analogue means or by digital means as in the case of the differentiating circuit shown in FIG. 10.

The differentiating circuits shown in FIGS. 9 and 10 correspond to the above-mentioned principal of construction of the differentiating circuit 11 in the calculator units shown in FIGS. 3 and 4. In the case of the differentiating circuits in FIGS. 9 and 10, the input voltage U is fed to the input amplifier 43 which on its output side provides an output current $i = SU$ proportional to the input voltage U. This current $i$, with which the capacitor 44 is charged, is integrated in the capacitor 44. The capacitor voltage $U_c$ of the capacitor 44 thus constitutes the integration result of the above-mentioned time related integration of the input value of the differentiating circuit. The capacitor voltage $U_c$ increases with the mean value $i_m$ of the output current $i$ of the amplifier 43 within the period of time T by a voltage differential $\Delta U_c = i_m \cdot t/C$. In the case of the differentiating circuits in FIGS. 9 and 10, now, in principle, this voltage difference $\Delta U_c$ is maintained constant (or equal to the difference $U_6 - U_7$ of voltages $U_6$ and $U_7$ from the direct current voltage sources 45 and 46) and the period of time T is determined which is needed for charging the capacitor 44 by this constant voltage difference $U_c = U_6 - U_7$. According to the relationship indicated above for $U_c$, this period of time becomes $T + C \cdot U_c/i_m = C(U_6 - U_7)/i$ and is therefore inversely proportional to the time related mean $i_m$ of the output current $i$ from the amplifier 43 during the charging time T of the capacitor 44. From the measured charging time T, therefore, for the mean value $U_m$ of the input value U of the differentiating circuit in FIG. 9 or FIG. 10 during the charging time T, at $T = C(U_6 - U_7)/i_m$ and $i_m = SU_m$, the relationship becomes $U_m = C(U_6 - U_7)/S \cdot T$. As already mentioned above, then, in order to determine the difference quotient to be formed by the differentiating circuit in FIGS. 9 or 10, or in order to determine the rise with respect to time in the input value of the differentiating circuit during the final charging of the capacitor 44, the difference between the time related means of the input value at the final and penultimate charging of the capacitor 44 are determined and divided by the charging time at the final charging. If the mean value of the input value at the final charging is designated $U_{m_{\nu-1}}$ while the input value at the penultimate charging is designated $U_{m_{\nu-2}}$, and if the charging time needed for charging the capacitor 44 from $U_7$ to $U_6$ is designated at the final charging $T_{\nu-1}$ and at the penultimate charging as $T_{\nu-2}$, then the difference quotient $\Delta U/\Delta t = (U_{m_{\nu-1}} - U_{m_{\nu-2}})/T_{\nu-1}$, and with the above relationship for $U_m$, therefore, the difference quotient becomes $$\frac{\Delta U}{\Delta t} = \frac{C(U_6 - U_7)}{S} \left(\frac{1}{T_{\nu-1}} - \frac{1}{T_{\nu-2}}\right) / T_{\nu-1}$$

$$= \frac{C(U_6 - U_7)}{S} \cdot (T_{\nu-2} - T_{\nu-1}) / T_{\nu-1}^2 \cdot T_{\nu-2}$$

Since in this equation, the values C, S and $(U_6 - U_7)$ are constant for the difference quotient, it is therefore possible from the measured charging times $T_{\nu-1}$ and $T_{\nu-2}$ representing the final and penultimate charging of the capacitor 44, by forming $(T_{\nu-2} - T_{\nu-1})/T_{\nu-2}^2 T_{\nu-2}$ to form a value proportional to the difference quotient $\Delta U/\Delta t$ which is to be formed by the differentiating circuit. The formation of this value can be further simplified if instead of $T_{\nu-1}^2 T_{\nu-2}$, the practically equivalent value $T_{\nu-1}^3$ is inserted into the denominator. The resultant error is virtually negligible, because the increase in mean value of the input value of the differentiating circuit in FIG. 9 or FIG. 10 from one for the next charging of the capacitor 44 in relation to the mean value of the input value of the differentiating circuit is only very slight and therefore also the charging times $T_{\nu-1}$ and $T_{\nu-2}$ differ only very negligibly. The result therefore is a value proportional to the difference quotient $\Delta U/\Delta t$ which is to be determined if the difference $(T_{\nu-2} - T_{\nu-1})$ between the charging times for the penultimate and final charging of the capacitor 44 is divided by the third power $T_{\nu-1}^3$ for the charging time at the final charging of the capacitor 44. The differentiating circuits shown in FIGS. 9 and 10 serve therefore, in constant sequence, to determine the charging time necessary for charging the capacitor 44 from the voltage $U_7$ to the voltage $U_6$ using a charging current which is a linear function of the input value U of the differentiating circuit, and always to form from the last and penultimate times $T_{\nu-1}$ and $T_{\nu-2}$ a value proportional to the ratio of the difference $(T_{\nu-2} - V_{\nu-1})$ between the penultimate and the final determined time to the third power $T_{\nu-1}^3$ of the last period of time determined, which then in keeping with the preceding remarks, is proportional to the difference quotient $\Delta U/\Delta t$ or the time related derivative $dU dt$ of the input voltage U of the differentiating circuit.

The period of time needed to charge the capacitor 44 by the voltage difference $\Delta U_c = U_6 - U_7$ is in the case of the differentiating circuits in FIGS. 9 and 10 in principle determined by the fact that the number $z$ of pulses emitted by the pulse generator 47 from the moment at which the voltage of the capacitor 44 passes through the value $U_7$, to the moment at which the voltage of the capacitor 44 passes through the value $U_6$, is counted in the first stage 48 of the shift register 49. It is first and foremost the first transfer circuit consisting of the direct current voltage source 46, the diode 50 and the resistor 51 and also the amplifier 52, and the second transfer circuit consisting of the direct current voltage source 45, the diode 53 and the resistor 54 as well as the amplifier 55, in conjunction with the two inverters 56 and 57 and the AND circuit 58 which serve to control this counting process. Current flows in the first transfer circuit 46, 50, 51 so long as the voltage of the capacitor 44 is lower than the voltage of the direct current source 46, because in this case the diode 50 is switched to gating. This current produces at the resistor 51 a voltage which is amplified by the amplifier 52 and passed to the inverter 56. At the inverter 56, there is at the input a 1 and at the output therefore a 0 so long as $U_c$ is less than $U_7$, and therefore the AND circuit 58 for $U_c$ less than $U_7$ is blocked by the inverter 56. Then, as soon as the capacitor voltage $U_c$ has reached the value $U_7$, the current through the first transfer circuit and thus the voltage at the resistor 51 and thus in turn the output voltage of the amplifier 52 becomes nil, i.e. from this moment on there is a 0 at the input of the inverter 56 and thus a 1 at its output, and therefore the AND circuit 58 at the moment when the capacitor voltage $U_c$ passes through the value $U_7$, is switched through, i.e. from this moment on, in the first stage 48 of the shift register 49, the pulses given out by the pulse generator 47 are counted. The voltage at the capacitor 44 rises then by reason of the current fed to the capacitor by the amplifier 43 until it has reached the voltage $U_6$ of the direct current voltage source 48. As soon as the capacitor voltage $U_c$ has passed through the value $U_6$, there flows through the second transfer circuit 45, 53, 54 a current since the diode 53 is switched to gating as soon as $U_c$ is less than $U_6$. The voltage drop caused by this current at the resistor 54 results in the output voltage of the amplifier 55 practically at the moment when the capacitor voltage $U_c$ passes through the value $U_6$ rising from zero to its saturation level. Thus, the input of the inverter 57 changes from 0 to 1 and correspondingly the output of the inverter from 1 to 0, whereupon the AND circuit 58 is blocked and accordingly the feed of pulses from the pulse generator 47 to the first stage 48 of the shift register 49 is discontinued. The counting process is thus concluded and the number z now present in the first stage 48 of the shift register 49 corresponds to the product of the pulse frequency $f$ of the pulse generator 47 and the period of time T needed to charge the capacitor 44 from $U_7$ to $U_6$. Simultaneously with blockage of the AND circuit 58, the rise in the output voltage of the amplifier 55 from zero to its saturation level brings about ignition of the thyristor 59 and thus the discharge of the capacitor 44. Since the capacitor voltage during discharge of the capacitor 44 again passes through the voltage range between $U_6$ and $U_7$ in which there is a 1 present at the outputs of the two inverters 56 and 57, during this discharge phase of the capacitor 44, the AND circuit 58 would be switched through once again and thus the counting result would be falsified. In order to prevent this, a very small resistor 60 is built into the circuit of the thyristor 59 and during discharging of the capacitor 44 due to the flow of current through the thyristor 59, a voltage drops, which is amplified by the amplifier 61 and passed on to the input of the inverter 62. During discharging of the capacitor 44, there is accordingly a 1 at the input of the inverter 62 and therefore a 0 at its output, so that the AND circuit 58 remains blocked throughout the entire discharging of the capacitor 44 and thus also during the phase when the capacitor voltage is passing through the range between $U_6$ and $U_7$. As soon as the capacitor voltage during discharging of the capacitor 44 falls below the level $U_7$, current again commences to flow in the first transfer circuit 45, 50, 51 and the voltage drop at the resistor 51 which is caused thereby results in the output voltage of the amplifier 52, at the moment when the voltage of the capacitor 44, during its discharging, passes through the value $U_7$, rising from nil to its saturation level. This suddenly rising output voltage of the amplifier 52 acts through the line 63 as an extinguishing pulse on the shift pulse counter 64 and sets this at zero in all its counting stages. Thus, a 1 is fed to the control line 66 connected to the zero output of the fifth counting stage 65 of the shift pulse counter 64 and thus the AND circuit 67 is switched through. Now, via the AND circuit 67, the pulse generator 47 feeds to the shift pulse input of the shift register 49 shift pulses by which the number present in the first register stage 48 of the shift register 49 is displaced into the second register stage 68 while the number present in the second register stage 68 is displaced into the third register stage 69 of the shift register 49 and at the same time the first register stage 48 of the shift register 49 is set at zero because at the output of the AND circuit 58 and thus at the counting input of the first register stage 48 of the shift register 49, 0 is present during shifting. The shift register 49 is constructed as a purely serial shift register with 48 (= 3 × 16) binary stages. Each of the three register stages 48, 68 and 69 of the shift register 49 has therefore 16 serially connected binary stages. In order to shift a number from one register stage to the next, therefore, it is necessary for a total of 16 shift pulses to be fed from the pulse generator 47 through the AND circuit 67. These shift pulses are counted in the shift pulse counter which is constructed from five serially disposed binary stages. After the 16th shift pulse, the fifth counting stage 65 of the shift pulse counter 64 changes from 0 to 1 and thus the output value at the 0 output of this fifth counting stage 65 changes from 1 to 0. Thus, via the control line 66, the AND circuit 67 is blocked and thus the shifting process is completed. The time needed for this shift process amounts, for a pulse sequence frequency $f$ of the pulse generator 47 of for example 400 Hz, to about 25 msec. and is therefore somewhat below the period of time elapsing from the point in time at which the capacitor voltage during capacitor discharge in a falling direction passes through the value $U_7$ to the point in time at which the capacitor voltage after extinction of the thyristor 59 and the subsequently resuming capacitor charging in a rising direction, again passes through the value $U_7$. The shift process is such that at commencement of the next counting operation which starts at the moment when the capacitor voltage, during charging of the capacitor, passes through the value $U_7$, it is already long completed. The differentiating circuits shown in FIGS. 9 and 10 determine therefore in constant succession the charging time needed to charge the capacitor 44 from the voltage $U_7$ to the voltage $U_6$ with a charging current which is a linear function of the input value U of the differentiating circuit, and store numerical values corresponding to the charging times, in sequence, in the shift register 49, the first register stage 48 serving as a numerical memory while the second and third register stages 68 and 69 of the shift register 49 serve to store the last and the penultimate determined charging time $T_{\nu-1}$ and $T_{\nu-2}$ or for storing numerical values $z_{\nu-1} = f \cdot T_{\nu-1}$ and $z_{\nu-2} = f \cdot T_{\nu-2}$ which are proportional to these charging times.

As already mentioned above, it is necessarily from the input value U of the differentiating circuit first to form the time related medium over a certain period of time of 1 to 2 minutes. The time taken to charge the capacitor 44 from voltage $U_7$ to voltage $U_6$ ought accordingly to be of the order of 1 to 2 minutes. For a capacitance C of the capacitor 44 of 50 $\mu$F and a potential difference $U_6 - U_7$ of 100 V, then for a charging time of approx. 1 to 2 minutes, the charging current of the capacitor should be between approx. 80 and 40 $\mu$A. If this condition is satisfied at commencement of filtration by the current supplied by the input amplifier 43, then on the basis of the already mentioned fact that the ratio of the flow resistance of the overall sedimentation layer at the end of filtration to the flow resistance at the commencement of filtration is as a rule between 50:1 and 10:1, then, at least when using one of the differentiating circuits in FIGS. 9 and 10 for the calculator unit shown in FIG. 3 at completion of filtration, an output current of the input amplifier 43 of (50 . . . 10) × (80 . . . 40 $\mu$A), i.e. therefore from 4 to 0.4 mA, would result. Thus, however, the charging time of the capacitor 44 of 1 to 2 minutes would at commencement of filtration drop to 12.5 to 1.25 seconds, i.e. the time taken to form a mean value would then be so greatly shortened that a reliable elimination of the aforesaid interference variables would no longer be guaranteed. In addition, with a lowering of the charging time of the capacitor by for example the factor 10 while retaining a constant increase in the flow resistance curve over the course of time, the time difference $T_{\nu-2} - T_{\nu-1}$ would drop by the factor 1000, for if the rise in flow resistance in course of time remains equal, then also the ratio $(T_{\nu-2} - T_{\nu-1})/T_{\nu-1}^3$ which is proportional to this rise must remain the same, and if in this ratio $T_{\nu-1}$ becomes smaller by the factor, then the denominator of this ratio must become smaller by the factor 1000, and since the ratio itself must remain the same, then also the enumerator of the ratio and thus therefore $T_{\nu-1} - T_{\nu-2}$ must become smaller by the factor 1000. This means however that in addition to the increased influence of the disturbing variables in the reduction of the charging time of the capacitor, further faults are caused by this time difference which is now of the order of msec. Furthermore, naturally, in order to achieve the same accuracy, also each register stage of the shift register 49 must be extended by the factor 1000, i.e. in other words by 10 binary stages, which would greatly increase the cost of the shift register. In order to avoid such faults occasioned by an all too extensive lowering of the charging time of the capacitor 44, it is expedient to add to the input value U in the differentiating circuits in FIGS. 9 or 10 a constant basic value which should be more or less so dimensioned that the sum of the input value U and this basic value rises from the commencement to the completion of the filtration by about the factor 2. Such a constant basic value has no effect on the result of differentiation and thus on the starting value of the differentiation circuit in FIG. 9 or 10 (apart from the avoidance of the previously explained faults already intended by this constant basic value), because constant values of course cancel each other out during differentiation. The exact level of the basic value is therefore completely uncritical, i.e. the basic value can according to experience be roughly so adjusted that the input value U raised by this basic value rises from the commencement to the completion of filtration by a factor which lies for example in the range from 1.5 to 2.5. The addition of such a constant basic value is in principle necessary only when using the differentiating circuit in FIGS. 9 or 10 for the calculator unit shown in FIG. 3, because in the case of the calculator unit shown in FIG. 4, the input value U of the differentiating circuit 11 is an $e$-function $e^{k\cdot p/q}$, which for $p/q = 0$ is not (like the input value of the differentiating circuit 11 in the case of the calculator unit 3) equal to 0 but is equal to 1. For this $e$-function, the said requirement that its value at the end of filtration should be approximately twice as great as at the commencement of filtration, is for correct adjustment of the exponent or correct setting of the resistor $R_1$ in FIGS. 6 or 8 in any event satisfied. For adjustment of the said basic value, in the differentiating circuits in FIGS. 9 and 10, the direct current voltage source 70 shown by dashdotted lines is used. The direct current voltage source 70 produces proportional to it, an output current of the amplifier 71 which as a constant value becomes added to the output current of the amplifier 43 and together with this it forms the charging current of the capacitor 44. This boosting of the output current of the amplifier 43 by the output current 71 is equivalent to the increase of the input value U of the differentiating circuit in FIG. 9 or 10 by the said constant basic value.

From the numerical values $z_{\nu-1} = f \cdot T_{\nu-1}$ and $z_{\nu-2} = f \cdot T_{\nu-2}$ present after completion of the above-mentioned shifting process in the register stages 68 and 69 of the shift register 49 and proportional to the last or penultimate charging time $T_{\nu-1}$ and $T_{\nu-2}$, then, in the differentiating circuits in FIGS. 9 and 10, an output current $I_A$ from the differentiating circuit is generated which is proportional to the ratio $(z_{\nu-2} - z_{\nu-1})/z_{\nu-1}^3$ and thus the ratio $(T_{\nu-2} - T_{\nu-1})/T_{\nu-1}^3$ and thus in accordance with the above remarks proportiona, to the difference quotient $\Delta U/\Delta t$ or the time related derivative $du/dt$ of the input voltage U of the differentiating circuit. To this end, in the adding network 72 which is connected on the one hand to the outputs of the individual binary stages of the register stage of the shift register 49 and on the other to the complementary outputs of the individual binary stages of the register stage 68 of the shift register 49, firstly by addition of the complementary value $z_{\nu-1}$ from $z_{\nu-1}$ to $z_{\nu-2}$ the difference $\Delta z = z_{\nu-2} - z_{\nu-1}$ is formed. Since the adding network 72 is via the feed lines 73 and 74 constantly in communication with the register stages 68 and 69 of the shift register 49, this difference $\Delta z$ is already directly upon completion of the shift process present at the output of the adding network 72. After the last shift pulse fed to the shift register 49, therefore, there is in the register stage 68 of the shift register 49 the number $z_{\nu-1}$ which is proportional to $T_{\nu-1}$ and at the output of the adding network 72 is the number $\Delta z = z_{\nu-2} - z_{\nu-1}$ which is proportional to the difference $(V_{\nu-2} - T_{\nu-1})$.

In the case of the differentiating circuit in FIG. 9, this number $\Delta z$ which is present at the output of the adding network is at the moment of completion of the shift process stored in the register 75 where it remains until completion of the next shift process. For the purpose of this storage, there is fed to the register 75 by the shift pulse counter 64 and via the setting line 76, simultaneously with the last shift pulse a second signal which remains at the register 75 until the commencement of the next shift process, and its result is that the register 75 is adjusted to the number $\Delta z$ provided by the adding network 72. Connected to the register 75 is an evaluator 77 which consists of an evaluating resistance for each binary stage of the register 75. From binary stage to binary stage of the register 75, the guide values of these resistances differ by the factor 2 and in the binary stage of the lowest magnitude, the guide value is equal to $G_R$. If the output voltage of the individual binary stages of the register 75 in the 1 condition equals $U_R$, then from the register 75 via the evauluating resistors of the evaluator 77, an output current $I_R = U_R \cdot \Delta z \cdot R_R$ is driven which is proportional to $\Delta z$. The currents driven via the evaluating resistors of the evaluator 77 are made to converge at the output of the evaluator 77 and are added to the aforementioned output current $I_R$ from the evaluator 77, which is proportional to $\Delta z$. With the output current $I_R$ from the evaluator 77, a voltage is generated at the resistor 78 which is proportional to $\Delta z$. The capacitance $C_R$ of the capacitor 77 which is connected in parallel with this resistor 78 is so dimensioned that the voltage jump resulting when a new number $\Delta z$ is stored in the register 75, at the resistor 78, is rounded off over a period of 5% to 50% of the average charging time of the capacitor 44. Upon completion of this rounding off, there is at the input of the amplifier 80 and proportional to $\Delta z$ a voltage which produces an output current of the amplifier 80 which is proportional to $\Delta z$. An identical evaluator 81 to the evaluator 77 is connected to the register stage 68 of the shift register 69. The output current $I_{SR}$ of this evaluator 81 is therefore proportional to $z_{v-1}$ and accordingly produces at the register 82 a voltage proportional to $z_{v-1}$. In order to round off the voltage jumps, a capacitor 83 is connected in parallel with the resistor 82. In this respect, it must be remembered that the time constant of the RC member 82, 83 ought, in order to avoid errors, to be at least equal to the time constant of the RC element 78, 79. Upon completion of the rounding off, the voltage present at the resistor 82 and proportional to $z_{v-1}$ produces, proportional to $z_{v-1}$ an output current of the amplifier 84. In the analogue computer circuit consisting of Hall multipliers 85, 86, 87 and 88 and amplifiers 89, 90, 91 and 92, then, from the output current of the amplifier 84 which is proportional to $z_{v-1}$ and the output current of the amplifier 80 which is proportional to $\Delta z$, an output current $I_A$ is produced which is proportional to $\Delta z/z_{v-1}^3$ and thus correspondingly proportional to $dU/dt$, according to the above remarks. In principle, this is achieved by means of the Hall multiplier 85 and the amplifier 89 which is of virtually infinite amplification, and by means of the direct current voltage source $U_8$, in the same way as explained above in connection with the divider circuit shown in FIG. 5, which generates an output current of the amplifier 89 which is inversely proportional to the input current of the Hall multiplier 85 as supplied by the amplifier 84 and which, since the output current of the amplifier 84 is proportional to $z_{v-1}$, is inversely proportional to $z_{v-1}$. This output current of the amplifier 89 which is inversely proportional to $z_{v-1}$ is fed to the Hall multipliers 86, 87 and 88. Furthermore, the amplifier 80 feeds to the Hall multiplier 86 a current proportional to $\Delta z$, so that the output voltage of the Hall multiplier 86 is proportional to $\Delta z/z_{v-1}$. The output voltage of the Hall multiplier 86 is converted in the amplifier 90 into a current proportional to $\Delta z/z_{v-1}$, which is fed to the Hall multiplier 87. The output voltage of the Hall multiplier 87 is therefore proportional to $\Delta z/z_{v-1}^2$. This output voltage is in the amplifier 91 converted to a current proportional to $\Delta z/z_{v-1}^2$ which is fed to the Hall multiplier 88. The output voltage of the Hall multiplier 88 is proportional to $\Delta z/z_{v-2}^3$ and is then in the amplifier 92 converted into the current $I_A$ which is proportional to $\Delta z/z_{v-1}^3$ and thus, in accordance with the above remarks, to $dU/dt$, which forms the output current of the differentiating circuit shown in FIG. 9.

In the case of the differentiating circuit in FIG. 10, the numerical values $\Delta z$ and $z_{v-1}$ present after the shifting process at the outputs of the adding network 72 and the register stage 68 of the shift register 49 are fed into the digital computer 93 which after completion of the shift process calculates the numerical value $w = \Delta z/z_{v-1}^2$ from $\Delta z$ and $z_{v-1}$. For this purpose, simultaneously with the last shift pulse, a computation signal is fed to the computer 93 via the line 94 which, after a time lag provided for in the computer 93 and of somewhat longer duration than the period of the shifting pulse, triggers this calculating process. The computer 93 can be of extremely simple construction, similarly to the commercially available electronic pocket calculator and is rigidly programmed for the intended calculation process. Upon conclusion of the calculation process, the said number $w$ is present at the output of the computer 93. Then, via the line 95, the calculator 93 passes to the register 96 a setting pulse whereupon the number $w$ is stored in the register 96 remaining there until the end of the next shift process. Connected to the register 96 is the evaluator 97 which in the same way as the evaluators 77 and 81 in the case of the differentiating circuit in FIG. 9, consists of correspondingly staged resistors connected to the individual binary stages of the register 96 and converts the numerical value $w$ in the register 96 into a current $I_R = U_R \cdot w \cdot G_R$ which is proportional to this numerical value $w$. This current $I_R$ is fed to the resistor 98 and generates at this resistor a voltage proportional to $w$. Parallel with the resistor 98, for rounding off the jumps in the current $I_R$ occurring in each case when storing a fresh numerical value $w$ in the register 96, the capacitor 99 is connected in parallel and can be so dimensioned that the voltage jumps occurring without this capacitor 99 and at the resistor 98 are rounded off over 5 to 50% of the charging time of the capacitor 44. The voltage proportional to $w$ and present at the resistor 98 upon completion of this rounding off is, in the amplifier 100, converted into the current $I_A$ which is likewise proportional to $w$ and thus to $\Delta z/z_{v-1}^3$ and thus to $(T_{v-2} - T_{v-1})/T_{v-1}^3$ and thus corresponding according to the above remarks to the difference quotient $\Delta U/\Delta t$ or the time related derivative $d/dt$ of the input voltage U of the differentiating circuit and which forms the output current from the differentiating circuit in FIG. 10.

As an integrator 7 for the calculator unit shown in FIG. 2, it is expedient to use the integration circuit shown in FIG. 11. In the case of the integration circuit in FIG. 11, the input value U is, in the amplifier 101, converted into the current SU which is fed to the capacitor 102. Therefore, the voltage of the capacitor 102 rises according to the equation $U_c = 1/C \int i_c dT = 1/C \cdot \int SU \, dt = S/C \int U \, dt$ with the integral of the input value U. As soon as the capacitor voltage $U_c$ reaches the voltage $U_{10}$ of the direct current voltage source 103, the diode 104 becomes conductive and the current flowing thereafter through the diode 104 generates at the resistor 105 a voltage drop which is amplified by the amplifier 106 and passed as an ingition pulse to the thyristor 107. As a result, the thyristor 107 is ignited at the moment when the voltage $U_c$ of the capacitor 102 exceeds the voltage $U_{10}$ of the direct current voltage source 103 and thus the capacitor 102 is discharged again within a very short discharging time which is negligibly small in comparison with the charging time of the capacitor 102. Then, a renewed process of charging the capacitor 102 commences. At the instant of ignition of the thyristor 107, the capacitor voltage $U_c$ of the capacitor 102 is as stated equal to $U_{10}$ and thus therefore $$U_{10} = \frac{S}{C} \int_{t_o}^{t_1} U \, dt,$$

if $t_o$ denotes the moment of starting and $t_1$ denotes the moment of ending the relevant charging process of the capacitor 102.

If a series of successive chargings of the capacitor 102 is examined, then for each of these charging processes and thus therefore generally for the v and th charging process, the following will apply.

$$U_{10} = \frac{S}{C} \int_{t_{v-1}}^{t_v} U \, dt$$

Since, now, the integral is $$\int_0^{t_z} U\,dt = \sum_{v=1}^{z} \int_{t_{v-1}}^{t_v} U\,dt$$

and each individual integral of this sum is according to the aforementioned equation equal to $C\cdot U_{10}/S$, the total integral is $$\int_0^{t_z} U\,dt = z \cdot \frac{C \cdot U_{10}}{S}, \text{ whereby } z$$

is the number of charging processes of the capacitor 102 from the commencement of integration at the moment in time when $t = 0$ as far as the moment in time $t_z$. The number of times the capacitor 102 is charged is now counted by the counter 108, in that a counting pulse is fed to the counter 108 simultaneously with each ignition of the thyristor 107 or with each discharge of the capacitor 102 through the line 109. The number $z$ present in the counter 108 is according to the above equation equal to $z = S/CU_{10} \int U\,dt$. The evaluator 110 is connected to the counter 108. The evaluator 110 consists of, connected to the outputs of the individual binary stages of the counter 108, resistors stepped by the factor 2 from binary stage to binary stage, the resistor connected to the binary stage of the lowest magnitude having the guide value $G_z$. The output voltage of the binary stages of the counter 108 in the 1 condition is equal to $U_z$. Therefore, the evaluator 110 converts the number $z$ in the counter 108 into a current $I_z = U_z \cdot z \cdot G_z$ which is proportional to $z$, which is given off by the output of the evaluator 110. This current energises at the resistor 111 a voltage $z \cdot U_z G_z R_z$ which is proportional to $z$. Connected in parallel with the resistor 111 is the capacitor 112 which rounds off the voltage jumps which would without the capacitor 112 occur at each onwards counting of the counter 108 at the resistor 111. The duration of this rounding off can advantageously be between 20 and 100% of the mean charging time of the capacitor 102. At the end of the rounding off, there is at the input of the amplifier 113 the voltage $z \cdot U_z G_z R_z$ which is converted by the amplifier 113 into the current $I_A = S \cdot z \cdot U_z G_z R_z = S^2 U_z G_z R_z / C \cdot U_{10} \int U\,dt$ which is proportional to this voltage. This current forming the output current of the integrating circuit in FIG. 11 is therefore proportional to the time integral $\int U\,dt$ of the input voltage U of the integrating circuit in FIG. 11.

In conclusion, it should also be pointed out that within the framework of the present method, there is in addition a particularly advantageous possibility of monitoring the level of suspended matter in the unfiltered supply. It was of course already pointed out earlier in connection with the explanation of the said first possibility, that the ratio of the pressure drop $p$ above the layer of sediment to the product of the quantity of liquid $q$ flowing through the layer of sediment per unit, of time and the total quantity of liquid Q filtered since the commencement of filtration is, for constant composition of sediment and filter aid, proportional to the quantity of sediment per unit of volume of the unfiltered feed. If, therefore, by means of the present method, a constant composition of sediment and filter aid is maintained, then the ratio $p/q \cdot Q$ is at least approximately proportional to the quantity of sediment per unit of volume of the unfiltered feed, and in this case therefore the mean level of sediment contained in the unfiltered feed can be shown by forming the ratio $p/q \cdot Q$ and indicating in legible form a value which is proportional to this ratio. If this mean sediment level in the unfiltered feed which can be read off at the indicating instrument is relatively high, then by raising the proportionality factor between the third value delivered by the calculator unit 6 and the quantity of filter aid fed to the unfiltered supply per unit of time and proportional thereto, the ratio of filter air to sediment in the unfiltered feed can be increased. For forming a value proportional to the ratio $p/q \cdot Q$, in the case of the calculator unit in FIG. 2, the output value $I_3$ is further divided by a divider circuit, by a value proportional to $q$, and in the case of the calculator units in FIGS. 3 and 4, the output value of the divider circuit 9 is likewise divided by a further divider circuit, by a value proportional to Q, the value proportional to Q being obtained from the value proportional to $q$ and fed to the calculator unit via the control line 19, by integration with respect to time, e.g. by means of the integrating circuit in FIG. 11.

I claim:

1. A method of controlling the quantity of filter aid fed to a settling filter during filtration per unit of time by admixture with the unfiltered feed comprising forming a first magnitude which is a linear function of the pressure drop across the settling filter, forming a second magnitude which is dependent on the quantity of liquid flowing through the settling filter per unit of time, and adjusting the quantity of filter aid fed to the unfiltered feed per unit of time in proportion to a third magnitude which is dependent on the ratio of said first magnitude to said second magnitude and/or on variations in this ratio with respect to time.

2. A method according to claim 1 comprising measuring both the liquid pressure on the unfiltered feed side and the liquid pressure on the filtrate side of the filter, forming a magnitude which is a linear function of the difference between the two measured liquid pressures, and using this magnitude as said first magnitude.

3. A method according to claim 1 comprising measuring the liquid pressure on the unfiltered feed side of the filter while maintaining the liquid pressure on the filtrate side of the filter at an at least approximately constant value, forming a magnitude which is a linear function of the measured liquid pressure on the unfiltered feed side of the filter, and using this magnitude as said first magnitude.

4. In a method according to claim 1, wherein the settling filter is a filter press comprising a plurality of filter press plates, a feed tube for distributing the unfiltered feed over the individual filter press plates, and a discharge tube for collecting the filtrate flowing out of the individual filter press plates, the steps of measuring the liquid pressure on the unfiltered feed side of the filter in said feed tube and using such measurement in forming said first magnitude.

5. A method according to claim 2, wherein the settling filter is a filter press comprising a plurality of filter press plates, a feed tube for distributing the unfiltered feed over the individual filter press plates, and a discharge tube for collecting the filtrate flowing out of the individual filter press plates, said liquid pressure on the unfiltered side of the filter is measured in said feed tube, and said liquid pressure on the filtrate side of the filter is measured in said discharge tube.

6. A method according to claim 3, wherein the settling filter is a filter press comprising a plurality of filter press plates, a feed tube for distributing the unfiltered feed over the individual filter press plates, and a discharge tube for collecting the filtrate flowing out of the individual filter press plates, said liquid pressure on the unfiltered feed side of the filter is measured in said feed tube and said at least approximately constant liquid pressure is maintained on the filtrate side of the filter by connecting the discharge tube to a pressure equalising means.

7. In a method according to claim 1, wherein the settling filter is a candle filter comprising a filter chamber and a carrier plate sub-dividing the interior of the chamber and a plurality of filter candles suspended from the carrier plate, the steps of measuring the liquid pressure on the unfiltered feed side of the filter in that part of the chamber interior being below the carrier plate and forming the unfiltered feed chamber, and using such pressure in forming such first magnitude.

8. A method according to claim 2, wherein the settling filter is a candle filter comprising a filter chamber and a carrier plate sub-dividing the interior of the chamber and a plurality of filter candles suspended from the carrier plate, said liquid pressure on the unfiltered feed side of the filter is measured in that part of the chamber interior being below the carrier plate and forming the unfiltered feed chamber, and said liquid pressure on the filtrate side is measured in that part of the chamber interior being above the carrier plate and forming the filtrate chamber.

9. A method according to claim 3, wherein the settling filter is a candle filter comprising a filter chamber and a carrier plate sub-dividing the interior of the chamber and a plurality of filter candles suspended from the carrier plate, said liquid pressure on the unfiltered feed side of the filter is measured in that part of the chamber interior being below the carrier plate and forming the unfiltered feed chamber and said at least approximately constant liquid pressure on the filtrate side is maintained by exerting a substantially constant pressure on the filtrate.

10. A method according to claim 9, wherein said substantially constant pressure on the filtrate is exerted by connecting a gas pressure source with a constant gas pressure to the filtrate side of the filter.

11. A method according to claim 1, wherein said first magnitude is made proportional to the pressure difference between said pressure drop and a predetermined pressure value.

12. In a method according to claim 11, wherein layers of turbid matter interspersed with filter aid settle on said filter during filtration and including the step of selecting said predetermined pressure value so that said pressure difference corresponds at least approximately to the mean pressure drop over said layers of filter aid whereby said first magnitude is at least approximately proportional to the mean pressure drop over said layers of turbid matter.

13. In a method according to claim 12, wherein primary settling layers are first formed and including the step of making said first magnitude at least approximately proportional to the mean pressure drop over said layers of turbid matter by adjusting said first magnitude to zero after formation of said primary settling layers, said adjusting to zero being carried out at the beginning of filtration and with a predetermined quantity of liquid flowing through the filter per unit of time said predetermined quantity per unit of time corresponding to rated performance for said filter.

14. In a method according to claim 11, the step of selecting said predetermined pressure value to correspond at least approximately to the sum of those pressure drops between the unfiltered feed side and the filtrate side of the filter, which pressure drops are substantially independent of the time related throughput through the filter, whereby said first magnitude is at least approximately proportional to the sum of all other pressure drops between the unfiltered feed side and the filtrate side of the filter inclusive of the pressure drop over the layers of turbid matter settled during filtration, which pressure drops vary with fluctuations in the time related throughput through the filter in the same sense as the throughput.

15. A method according to claim 3, wherein said first magnitude is made proportional to the pressure difference between the measured liquid pressure on the unfiltered feed side of the filter and the sum of said constant value of the liquid pressure on the filtrate side of the filter and of a predetermined pressure value.

16. A method according to claim 1 wherein the pressures on the unfiltered side and the filtered side of said filter are measured and said first magnitude is made proportional to the pressure difference between the pressures measured on the unfiltered feed side and the filtrate side of the filter.

17. A method according to claim 3, wherein said first magnitude is made proportional to the difference between said measured liquid pressure on the unfiltered feed side of the filter and said constant value of the liquid pressure on the filtrate side of the filter.

18. A method according to claim 1, wherein said first magnitude is an electrical signal, and including the step of measuring the liquid pressure drop across said filter by a pressure converter converting the measured pressure values into corresponding values of an electrical signal.

19. A method according to claim 1, wherein the unfiltered feed is delivered to said filter by an unfiltered feed line and the filtered liquid is carried away from said filter in a filtrate line including the steps of measuring the mean flow rate at a measurement point in said filtrate line or in said unfiltered feed line, forming a magnitude proportional to this mean flow rate or to the integral of such rate with respect to time, and using this magnitude as said second magnitude.

20. In a method according to claim 19, wherein said second magnitude is an electrical signal, and said mean flow rate is measured by an inductive flow mater converting the measured values of the mean flow rate into corresponding values of an electrical signal.

21. A method according to claim 19 comprising leading the flowing liquid for achieving a regular flow at the measurement point upstream thereof and downstream thereof through a zone having at least in the vicinity of the measurement point the same cross-section of flow as at the measurement point.

22. A method according to claim 1 comprising forming a magnitude rising in a linear relationship with the entire quantity of liquid filtered from the beginning of filtration and using this magnitude as said second magnitude and forming a further magnitude in proportion to the ratio of said first magnitude to said second magnitude and using this further magnitude as said third magnitude.

23. A method according to claim 22 comprising forming a fourth magnitude in proportion to the quantity of liquid flowing through the filter per unit of time and forming a fifth magnitude in proportion to the entire quantity of liquid filtered from the beginning of filtration by integrating said fourth magnitude integrating said fourth magnitude with respect to time from the beginning of filtration and deriving from this fifth magnitude said second magnitude increasing in a linear relationship with this fifth magnitude.

24. A method according to claim 23, wherein the fifth magnitude is derived from the fourth magnitude by charging a capacitor of predetermined capacitance with a charging current proportional to the fourth magnitude in a continuous succession each time to a predetermined capacitor voltage, discharging the capacitor whenever this predetermined capacitor voltage has been reached within a discharging time of negligibly short duration in comparison with the charging time, counting these charging operations from the beginning of filtration, forming a magnitude in proportion to the number of charging operations since the beginning of filtration and using this magnitude as said fifth magnitude.

25. In a method according to claim 23, wherein layers of turbid matter settle on said filter during filtration and said first magnitude is made at least approximately proportional to the mean pressure drop over said layers of turbid matter settled during filtration by adjusting the first magnitude to zero at the beginning of filtration, said adjusting to zero being carried out with a quantity of liquid flowing through the filter per unit of time corresponding to rated filter performance, the steps of making said second magnitude proportional to said fifth magnitude, whereby said third magnitude at least approximately proportional to the ratio of the mean pressure drop across the layers of turbid matter settled during filtration to the entire quantity of liquid filtered from the beginning of filtration and feeding a rigidly predetermined quantity of filter aid per unit of time to the unfiltered feed during an initial phase of filtration in which both the mean pressure drop across the layers of turbid matter already settled since the beginning of filtration and the entire quantity of liquid already filtered since the beginning of filtration are still virtually nil and said third magnitude has therefore with 0:0 an undefined and/or greatly fluctuating value.

26. In a method according to claim 23, wherein the pressure difference between the unfiltered feed side and the filtrate side of the filter is measured and said first magnitude is made proportional thereto, the steps of forming said second magnitude by adding a constant sixth value to said fifth magnitude, said sixth value being so chosen that the value of said third magnitude lies at the beginning of filtration within a predetermined range, the lower limit of which corresponds to a minimum rate of filter aid dosage and the upper limit of which corresponds to a maximum filter aid dosage.

27. In a method according to claim 26 the step of adjusting said sixth value at the beginning of filtration so that the value of said third magnitude lies at the beginning of filtration approximately in the middle of said predetermined range.

28. A method according to claim 22, wherein said third magnitude is formed by dividing said first magnitude by said second magnitude.

29. In a method according to claim 28, wherein said first, second and third magnitudes are direct current voltages and/or direct currents, the step of dividing said first magnitude by said second magnitude by two Hall-multipliers connected together with an amplifier to a quotient former.

30. A method according to claim 1, wherein said second magnitude is made proportional to the quantity of liquid flowing through the filter per unit of time and said third magnitude is made proportional to the variation with respect to time in an additional magnitude which is dependent on the ratio of said first magnitude to said second magnitude.

31. A method according to claim 30, wherein the third magnitude is derived from said additional magnitude by the steps of charging a capacitor of predetermined capacitance from a predetermined first to a predetermined second potential value with a charging current varying as a linear function of said additional magnitude in a continuous succession each time to a capacitor voltage of at least a predetermined second potential value, discharging the capacitor whenever this capacitor voltage has been reached, determining each time the duration of time needed to charge the capacitor from said predetermined first to said predetermined second potential value of capacitor voltage, storing in each case the last determined and the penultimately determined durations of time and forming a magnitude in proportion to the ratio of the difference between said penultimately determined and said last determined duration of time to the cube of the last determined duration of time or to the product of the penultimately determined duration of time multiplied by the square of the last determined duration of time and using this magnitude as said third magnitude.

32. A method according to claim 31, wherein the duration of time needed to charge the capacitor from said first to said second potential value of capacitor voltage is determined by counting pulses of a predetermined pulse sequence frequency during said duration of time into the first stage of a three-stage shift register and wherein the pulse counts of said last determined and said penultimately determined durations of time are stored in the second and the third stage of said three-stage shift register respectively and wherein the difference between the pulse counts of said penultimately determined and said last determined durations of time is formed in an adding network connected with its data inputs to the second and third stages of said three-stage shift register.

33. In a method according to claim 31, wherein the duration of time needed to charge the capacitor from said first to said second potential value of capacitor voltage is determined by counting pulses of a predetermined pulse sequence frequency during said duration of time and wherein the pulse counts of said last determined and said penultimately determined durations of time are stored and the difference between the pulses counts of said penultimately determined and said last determined durations of time is determined, the steps of converting the stored pulse count of the last determined duration time and the pulse count difference between the penultimately determined and the last determined durations of time into analogue values and forming with these both analogue values by means of an analogue computer comprising four Hall-multipliers and at least three amplifiers said third magnitude in proportion to the ratio of said pulse count difference to the cube of the pulse count of the last determined duration of time.

34. In a method according to claim 31, wherein the duration of time needed to charge the capacitor from said first to said second potential value of capacitor voltage is determined by counting pulses of a predetermined pulse sequence frequency during said duration of time and wherein the pulse counts of said last determined and said penultimately determined durations of time are stored, the steps of forming, at the beginning of each pulse count, with the stored pulse counts $z_{\nu-2}$ and $z_{\nu-1}$ for said penultimately determined and said last determined durations of time by means of an adding network for forming $\Delta z = z_{\nu-2} - z_{\nu-1}$ and digital computing means comprising a divider circuit for forming $1/z_{\nu-1}$ or $1/z_{\nu-2}$ and $1/z_{\nu-1}$ and a multiplier circuit for forming $(1/z_{\nu-1})^3 \cdot \Delta z$ or $(1/z_{\nu-1})^2 \cdot 1/z_{\nu-2} \cdot \Delta z$, a numerical value corresponding to the ratio $(z_{\nu-2} - z_{\nu-1})/z_{\nu-1}^3$ or $(z_{\nu-2} - z_{\nu-1})/(z_{\nu-2} \cdot z_{\nu-1}^2)$ and storing this numerical value until the beginning of the next pulse count and deriving from the stored numerical value said third magnitude in proportion to this numerical value.

35. In a method according to claim 30, wherein the settling filter is a filter press and said additional magnitude is proportional to the ratio of said first magnitude to said second magnitude, the steps of forming said additional magnitude by dividing said first magnitude by said second magnitude and deriving from the thus-formed additional magnitude said third magnitude by determining the variations in this additional magnitude with respect to time.

36. In a method according to claim 35, wherein said first, second and third magnitudes and said additional magnitude are direct current voltages and/or direct currents, the step of dividing said first magnitude by said second magnitude by two Hall-multipliers connected together with an amplifier to a quotient former.

37. In a method according to claim 30, wherein the settling filter is a candle filter and said additional magnitude is at least approximately proportional to $e^{\alpha-\beta} - \gamma$ where $e$ is the base of the natural logarithms, $\alpha$ is an exponent proportional to the ratio of said first magnitude to said second magnitude, and $\beta$ and $\gamma$ are constant values, the steps of forming a further magnitude $\alpha-\beta$, which is a linear function of or proportional to the quotient of said first magnitude to said second magnitude, by dividing said first magnitude by said second magnitude and forming then with this further magnitude $\alpha-\beta$ said additional magnitude, which is at least approximately proportional to $e^{\alpha-\beta} - \gamma$, and deriving from this additional magnitude said third magnitude by determining the variations in this additional magnitude with respect to time.

38. In a method according to claim 37, $e^{\alpha-\beta}$ is approximated by a power series $$e^{\alpha-\beta} \approx \sum_{\nu=0}^{n} \frac{(\alpha-\beta)^\nu}{\nu!}$$

broken off after the $n$-th term and said additional magnitude is therfore proportional to $$\sum_{\nu=0}^{n} \frac{(\alpha-\beta)^\nu}{\nu!} - \gamma,$$

the steps of forming a plurality of magnitudes which are with equal proportionality factors proportional to the terms of said series of powers of said further magnitude $\alpha-\beta$, adding these magnitudes together to form a sum magnitude, and deriving from this sum magnitude said additional magnitude which is proportional to or a linear function of this sum magnitude.

39. In a method according to claim 38, wherein $n$ is 2 or 3, the step of making $\beta$ equal to the value $\alpha_o$ of said exponent resulting from the ratio of said first magnitude to said second magnitude which exists at the beginning of filtration by adjusting said further magnitude $\alpha-\beta$ to zero at the beginning of tiltration.

40. In a method according to claim 38, wherein said first to third magnitudes and said additional and further magnitudes are direct current voltages and/or direct currents, the steps of dividing said first magnitude by said second magnitude by two Hall-multipliers connected together with an amplifier to a quotient former and approximating $e^{\alpha-\beta}$ by said power series broken off after the $n$-th term by an analogous computer circuit comprising $n-1$ Hall-multipliers and at least $n$ amplifiers.

41. A method according to claim 1 comprising feeding the filter aid to the unfiltered feed via a liquid line leading to the unfiltered feed line of the settling filter and via a dosing pump in form of a filter aid suspension in a suspension liquid with a constant mixing ratio of the quantity of filter aid per unit of volume of suspension liquid and with an even distribution of the filter aid in the suspension liquid from a mixing tank serving for preparing the suspension, and controlling the quantity of filter aid fed to the unfiltered feed per unit of time by making the mean rate of delivery of said dosing pump proportional to said third magnitude.

42. In a method according to claim 41 the steps of feeding continuously said filter aid suspension to the unfiltered feed by a dosing pump of continuously variable delivery and varying the delivery from said dosing pump in proportion to said third magnitude.

43. In a method according to claim 42, wherein the dosing pump has a constant or rigidly adjusted delivery stroke and is driven by a motor of continuously variable speed, the step of varying the motor speed in proportion to said third magnitude.

44. In a method according to claim 42, wherein the dosing pump has a continuously variable volume of delivery and is driven by a motor of constant speed, the step of varying the delivery volume of the dosing pump in proportion to said third magnitude.

45. In a method according to claim 41 the steps of feeding discontinuously said filter aid suspension to the unfiltered feed by periodic actuation of a dosing pump of constant delivery and regulating the product of the actuation sequence frequench times the duration of actuation in proportion to said third magnitude.

46. In a method according to claim 45, wherein the duration of the actuation is constant, the step of adjusting the actuation sequence frequency in proportion to said third magnitude.

47. In a method according to claim 45, wherein the actuation sequence frequency is constant, the step of adjusting the duration of switching-on in proportion to said third magnitude.

48. In a method according to claim 25, wherein the filter aid is fed to the unfiltered feed via a liquid line leading to the unfiltered feed line of the settling filter and via a dosing pump in form of a filter aid suspension in a suspension liquid, with a constant mixing ratio of the quantity of filter aid per unit of volume of suspension liquid and with an even distribution of the filter aid in the suspension liquid, from a mixing tank serving for preparing the suspension, said dosing pump has a constant delivery and the filter aid suspension is discontinuously fed to the unfiltered feed by periodic actuation of the dosing pump, the actuation sequence frequency is constant, and the quantity of filter aid fed to the unfiltered feed per unit of time is controlled by adjusting the duration of actuation of the dosing pump in proportion to said third magnitude, the steps of feeding the instantaneous values of said fourth magnitude starting at the beginning of filtration at each actuation of the dosing pump to an adding memory, and adding such instantaneous value to the previously stored values and forming thereby in the adding memory a magnitude which is proportional to the entire quantity of liquid filtered from the beginning of filtration therefore proportional to said second magnitude, and after feeding of each instantaneous value of said fourth magnitude to the adding memory determining the instantaneous value of said third magnitude from the instantaneous values of said first magnitude and said magnitude in the adding memory by digital electronic computing means, and after expiry of said initial phase of filtration adjusting the duration of said actuation of said dosing pump in proportion to the last determined instantaneous value of said third magnitude.

49. An apparatus for carrying out the method according to claim 1 comprising pressure measuring means for determining the pressure drop across the settling filter and for forming said first magnitude as a linear function of this pressure drop; filtration performance measuring means for determining the quantity of liquid flowing through the settling filter per unit of time; means for forming said second magnitude which is dependent on this quantity of liquid passing the filter per unit of time; calculating means for forming from said first and said second magnitude said third magnitude dependent on the ratio of said first magnitude to said second magnitude an/or on the time related variation in this ratio with respect to time; a filter aid dosing means having a dosing rate which is variable in its time related average for dosing the quantity of filter aid fed to the unfiltered feed per unit of time and for feeding the filter aid to the unfiltered feed; filter aid storage means for supplying the dosing means with filter aid; and controlling means for controlling the time related average of the dosing performance of said filter aid dosing means in proportion to said third magnitude.

* * * * *